US012645671B2

(12) United States Patent
Tiwari et al.

(10) Patent No.: US 12,645,671 B2
(45) Date of Patent: Jun. 2, 2026

(54) ADAPTING EMBEDDINGS FOR CUSTOM RETRIEVAL

(71) Applicant: Microsoft Technology Licensing, LLC, Redmond, WA (US)

(72) Inventors: Ashish Tiwari, Sammamish, WA (US); Yasharth Bajpai, Lucknow (IN); Priyanshu Gupta, Bengaluru (IN); Sumit Gulwani, Sammamish, WA (US); Anirudh Vishal Khatry, Mumbai (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 306 days.

(21) Appl. No.: 18/440,593

(22) Filed: Feb. 13, 2024

(65) Prior Publication Data

US 2025/0258814 A1     Aug. 14, 2025

(51) Int. Cl.
| | |
|---|---|
| *G06F 16/242* | (2019.01) |
| *G06F 16/2452* | (2019.01) |
| *G06F 16/2457* | (2019.01) |

(52) U.S. Cl.
CPC .... *G06F 16/24522* (2019.01); *G06F 16/2438* (2019.01); *G06F 16/24573* (2019.01)

(58) Field of Classification Search
CPC ........... G06F 16/24522; G06F 16/2438; G06F 16/24573
See application file for complete search history.

(56) References Cited

U.S. PATENT DOCUMENTS

| | | | | |
|---|---|---|---|---|
| 9,672,206 B2 * | 6/2017 | Carus | ...................... | G06F 40/30 |
| 9,946,763 B2 * | 4/2018 | Barborak | ................ | G06F 16/23 |
| 12,039,263 B1 * | 7/2024 | Mondlock | ............... | G06F 40/20 |
| 12,306,828 B1 * | 5/2025 | Chakraborty | ..... | G06F 16/24522 |
| 12,405,977 B1 * | 9/2025 | Madisetti | ............ | G06F 16/3329 |
| 12,511,487 B2 * | 12/2025 | Marwah | .................. | G06F 40/30 |
| 2021/0349950 A1 * | 11/2021 | Setlur | .................... | G06F 40/30 |

(Continued)

OTHER PUBLICATIONS

Khatry, et al., "Augmented Embeddings for Custom Re-Trievals", Retrieved from: https://arxiv.org/abs/2310.05380, Oct. 2023, 14 pages.

*Primary Examiner* — Jorge A Casanova
(74) *Attorney, Agent, or Firm* — Novo TechIP International PLLC

(57) ABSTRACT

A data processing system implements receiving, via a user interface of a client device, a query to a large language model (LLM) working in conjunction with an embedding model comprising a corpus of artifacts. The system further implements converting the query into a query embedding, transforming the query embedding into a transformed query embedding using a first transformation function that adds a first residual term to the query embedding, the first residual term being specific for a task associated with the query, measuring a first similarity between the transformed query embedding and corpus element embeddings in an embedding space of the embedding model, determining first top-rated corpus element(s) associated with the corpus element embeddings based on the first similarity, incorporating the first top-rated corpus element(s) into the query as a prompt to the LLM to generate a response to the query, and providing, via the user interface, the response.

20 Claims, 10 Drawing Sheets

(56) References Cited

U.S. PATENT DOCUMENTS

| | | | |
|---|---|---|---|
| 2022/0253435 A1* | 8/2022 | Chen | G06N 3/0895 |
| 2022/0382741 A1* | 12/2022 | Sznajdman | G06N 5/022 |
| 2023/0061341 A1* | 3/2023 | Shmueli | G06F 16/258 |
| 2023/0147904 A1* | 5/2023 | Chen | G06V 20/46 |
| | | | 386/241 |
| 2023/0334045 A1* | 10/2023 | Bergman | G06F 16/906 |
| 2024/0346256 A1* | 10/2024 | Qin | G06F 40/216 |
| 2024/0403341 A1* | 12/2024 | Berglund | G06F 16/3326 |
| 2025/0036878 A1* | 1/2025 | Marwah | G06F 40/30 |
| 2025/0037222 A1* | 1/2025 | Oluleye | G06Q 50/18 |
| 2025/0045314 A1* | 2/2025 | Madnani | G06F 16/3329 |
| 2025/0061104 A1* | 2/2025 | Hou | G06F 16/245 |
| 2025/0086215 A1* | 3/2025 | Kumar | G06F 16/345 |
| 2025/0086647 A1* | 3/2025 | Gao | G06Q 30/015 |
| 2025/0103640 A1* | 3/2025 | Dicklin | G06F 16/3334 |
| 2025/0131247 A1* | 4/2025 | Mondlock | G06N 5/022 |
| 2025/0140244 A1* | 5/2025 | Lee | G10L 15/1815 |
| 2025/0147957 A1* | 5/2025 | Verkruyse | G06F 16/24522 |
| 2025/0156455 A1* | 5/2025 | Subbiah | G06F 16/3335 |
| 2025/0190456 A1* | 6/2025 | Kierzyk | G06F 16/383 |
| 2025/0200281 A1* | 6/2025 | Mohanty | G06F 40/279 |
| 2025/0200290 A1* | 6/2025 | Birru | G06F 16/33 |
| 2025/0209099 A1* | 6/2025 | Jensen | G06F 16/332 |
| 2025/0245665 A1* | 7/2025 | Tholar | G06Q 20/4016 |
| 2025/0307238 A1* | 10/2025 | Klein | G06N 3/0455 |
| 2025/0310303 A1* | 10/2025 | Xu | G06F 40/30 |

* cited by examiner

Table 2

| Name | Partitions | Queries Used | Corpus size |
|---|---|---|---|
| SciFact | train, test | 919 train, 339 test | 5K |
| ArguAna | test | 1406 test split into 1124 train, 282 test | 8.67K |
| FiQA | train, dev, test | 14166 train, 1706 test | 57K |
| NFCorpus | train, dev, test | 11385 dev as train, 12334 test | 3.6K |

Table 3

| Benchmark | OAH nDCG@ | | | ADDER nDCG@ | | | Adder2 nDCG@ | | |
|---|---|---|---|---|---|---|---|---|---|
| | 1 | 5 | 10 | 1 | 5 | 10 | 1 | 5 | 10 |
| SciFact | 0.62 | 0.70 | 0.73 | 0.65 | 0.71 | 0.77 | 0.74 | 0.81 | 0.82 |
| ArguAna | 0.32 | 0.54 | 0.59 | 0.37 | 0.49 | 0.53 | 0.36 | 0.52 | 0.56 |
| FiQA | 0.41 | 0.40 | 0.43 | 0.40 | 0.37 | 0.39 | 0.39 | 0.38 | 0.41 |
| NFCorpus | 0.46 | 0.40 | 0.37 | 0.47 | 0.43 | 0.40 | 0.45 | 0.37 | 0.35 |

Table 4

| X | OAH nDCG@ | | | ADDER nDCG@ | | | Adder2 nDCG@ | | |
|---|---|---|---|---|---|---|---|---|---|
| | 1 | 5 | 10 | 1 | 5 | 10 | 1 | 5 | 10 |
| SMCalFlow | 0.64 | 0.72 | 0.75 | 0.96 | 0.96 | 0.98 | 0.96 | 0.97 | 0.98 |
| Bash | 0.75 | 0.84 | 0.86 | 0.78 | 0.89 | 0.89 | 0.79 | 0.89 | 0.89 |
| CoNaLa | 0.77 | 0.87 | 0.88 | 0.75 | 0.85 | 0.86 | 0.75 | 0.87 | 0.88 |

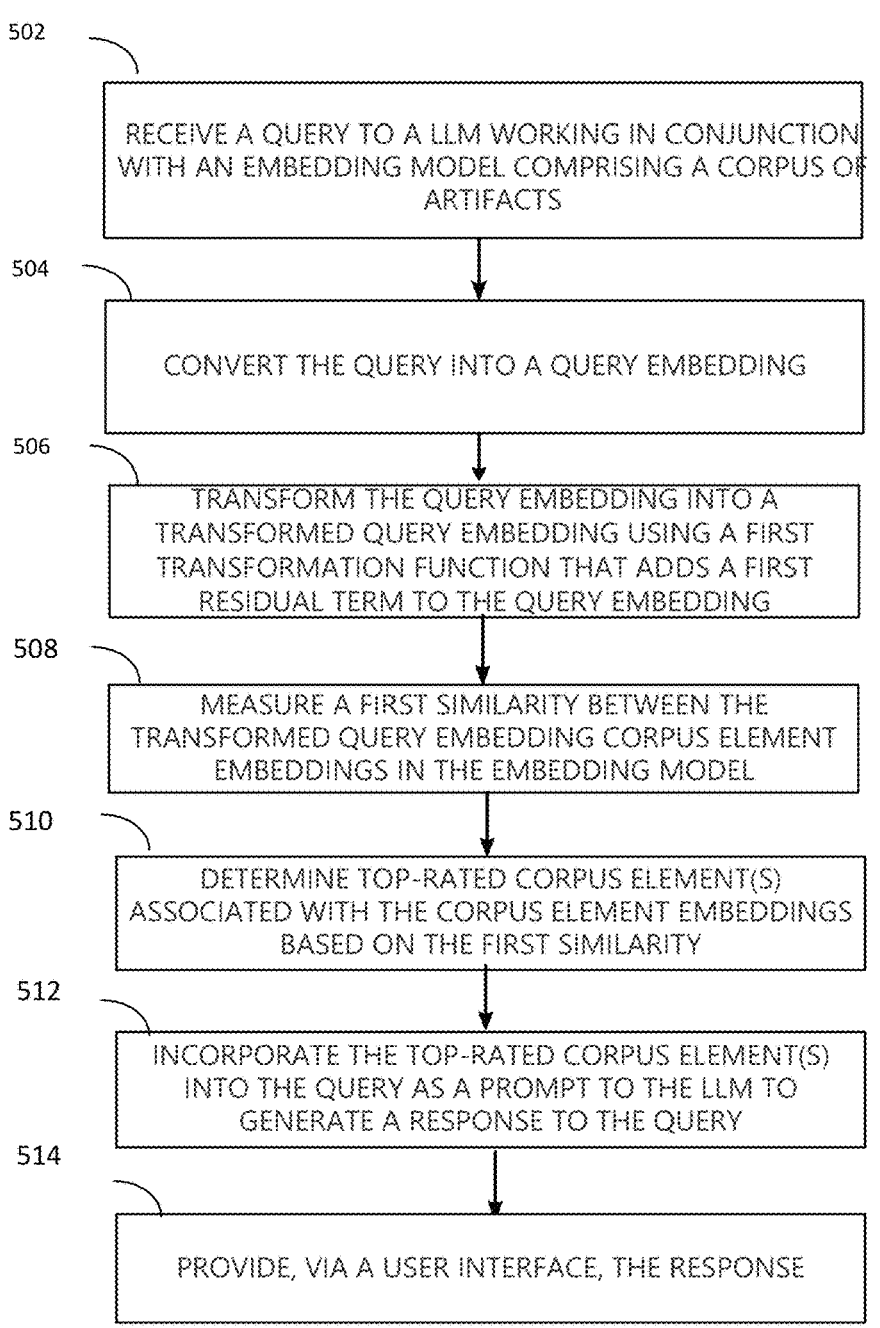

502

RECEIVE A QUERY TO A LLM WORKING IN CONJUNCTION WITH AN EMBEDDING MODEL COMPRISING A CORPUS OF ARTIFACTS

504

CONVERT THE QUERY INTO A QUERY EMBEDDING

506

TRANSFORM THE QUERY EMBEDDING INTO A TRANSFORMED QUERY EMBEDDING USING A FIRST TRANSFORMATION FUNCTION THAT ADDS A FIRST RESIDUAL TERM TO THE QUERY EMBEDDING

508

MEASURE A FIRST SIMILARITY BETWEEN THE TRANSFORMED QUERY EMBEDDING CORPUS ELEMENT EMBEDDINGS IN THE EMBEDDING MODEL

510

DETERMINE TOP-RATED CORPUS ELEMENT(S) ASSOCIATED WITH THE CORPUS ELEMENT EMBEDDINGS BASED ON THE FIRST SIMILARITY

512

INCORPORATE THE TOP-RATED CORPUS ELEMENT(S) INTO THE QUERY AS A PROMPT TO THE LLM TO GENERATE A RESPONSE TO THE QUERY

514

PROVIDE, VIA A USER INTERFACE, THE RESPONSE

FIG. 5

ADAPTING EMBEDDINGS FOR CUSTOM RETRIEVAL

BACKGROUND

AI-based information retrieval has become increasingly popular in recent years to enrich life and improve productivity. By effectively utilizing embeddings, AI-based generative models further enhance information retrieval, and enable more intelligent, meaningful, and context-aware search experiences. Embeddings can capture meanings and relationships between words and concepts, thereby retrieving conceptually relevant content even without sharing exact keywords. With efficient indexing and retrieval algorithms, the embedding-based retrieval can handle large datasets with lower computational costs compared to traditional methods. A popular application of embedding-based retrieval approach is retrieval-augmented generation (RAG), i.e., finding embeddings for the query and corpus and then using cosine similarity to pick the best artifacts from the corpus for the given query and then using those artifacts in a prompt sent to a generative model. RAG combines the strengths of two AI models: (1) a retrieval model finding relevant documents/passages aligned with a user query, and (2) a generative model, like GPT-4, crafting creative text formats. However, the existing RAG approaches using pre-trained embeddings are not using task-specific notions of similarity for retrieving artifacts, thus the performance of these RAG applications is unsatisfactory. Hence, there is a need for improving RAG systems and methods for information retrieval.

SUMMARY

An example data processing system according to the disclosure includes a processor and a machine-readable medium storing executable instructions. The instructions when executed cause the processor alone or in combination with other processors to perform operations including receiving, via a user interface of a client device, a query to a large language model (LLM) working in conjunction with an embedding model comprising a corpus of artifacts, converting the query into a query embedding, transforming the query embedding into a transformed query embedding using a first transformation function that adds a first residual term to the query embedding, the first residual term being specific for a task associated with the query, measuring a first similarity between the transformed query embedding and a plurality of corpus element embeddings in an embedding space of the embedding model, determining one or more first top-rated corpus elements associated with the plurality of corpus element embeddings based on the first similarity, incorporating the one or more first top-rated corpus elements into the query as a prompt to the LLM to generate a response to the query, and providing, via the user interface, the response.

An example method implemented in a data processing system includes receiving, via a user interface of a client device, a query to an LLM working in conjunction with an embedding model comprising a corpus of artifacts, converting the query into a query embedding, transforming the query embedding into a transformed query embedding using a first transformation function that adds a first residual term to the query embedding, the first residual term being specific for a task associated with the query, measuring a first similarity between the transformed query embedding and a plurality of corpus element embeddings in an embedding space of the embedding model, determining one or more first top-rated corpus elements associated with the plurality of corpus element embeddings based on the first similarity, incorporating the one or more first top-rated corpus elements into the query as a prompt to the LLM to generate a response to the query, and providing, via the user interface, the response.

An example non-transitory computer readable medium according to the disclosure on which are stored instructions that, when executed, cause a programmable device to perform functions of receiving, via a user interface of a client device, a query to an LLM working in conjunction with an embedding model comprising a corpus of artifacts, converting the query into a query embedding, transforming the query embedding into a transformed query embedding using a first transformation function that adds a first residual term to the query embedding, the first residual term being specific for a task associated with the query, measuring a first similarity between the transformed query embedding and a plurality of corpus element embeddings in an embedding space of the embedding model, determining one or more first top-rated corpus elements associated with the plurality of corpus element embeddings based on the first similarity, incorporating the one or more first top-rated corpus elements into the query as a prompt to the LLM to generate a response to the query, and providing, via the user interface, the response.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 4 are tables showing benchmarks for evaluating adapted dense retrieval of the system of FIG. 1.

FIG. 5 is a flow chart of an example process for providing adapted dense retrieval according to the techniques disclosed herein.

DETAILED DESCRIPTION

Figure 1:
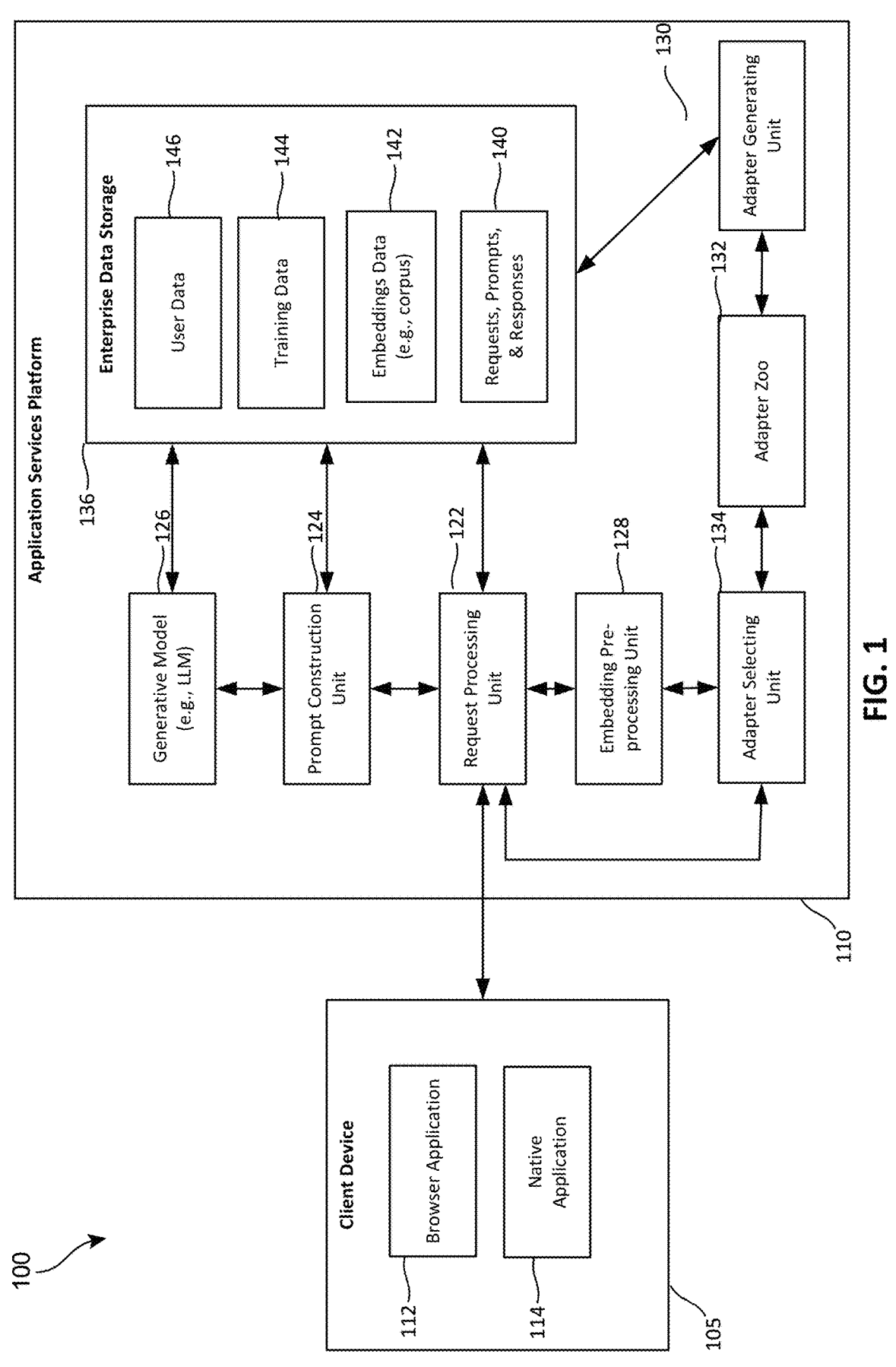
FIG. 1 is a diagram of an example computing environment in which the techniques for providing adapted dense retrieval are implemented.

Systems and methods for adapting embeddings for custom retrieval are described herein. These techniques provide a technical solution to the technical issues that arise in RAG that are different from the traditional applications of information retrieval. RAG first searches for documents (e.g., articles, or reports) or data/corpus (e.g., databases like Wikipedia®) that are topically relevant to a task at hand. This retrieval is usually done using semantic search techniques, which consider the meaning of the query rather than just keywords. The retrieved information is then injected into the LLM's context before the LLM generates its response. The existing augmentation provides the LLM with additional evidence and factual grounds to work with queries.

However, the existing RAG mechanisms face the following technical challenges. First, the RAG retrieval requirements can be heterogeneous in nature as the corpus may contain code, documentation, structured and semi-structured text, data, and artifacts in specialized domain-specific languages, instead of just text in natural language. The embeddings of these artifacts created by pretrained models (e.g., OPENAI ADA) may not necessarily be high quality because the pretraining data might not have access to the nature of the task for which the model can be used, and/or these special-purpose artifacts. Second, the RAG retrieval results are restricted to top-k artifacts for a much smaller k, since LLM prompts have size-limits due to cost and model-induced constraints. In addition, LLMs show signs of hallucination when irrelevant data is provided. As a result, the accuracy of the top-10 or top-50 artifacts matters much less than the top-1 or top-5 performance. Thirdly, the RAG retrieval queries are more nuanced due to task-specific notions of what is similar or relevant. This notion of similarity may not match the notion of similarity learnt by general-purpose embeddings produced by general-purpose models.

The system developed by the inventors can fine-tune embedding model(s) with task-specific data, to solve the above discussed RAG retrieval technical challenges. The pretrained embeddings can be seen as an analogy for pre-trained language models. Pretrained generative language models can be fine-tuned for specialized domain-specific tasks to improve performance by training the weights of a pretrained embedding model on new task-specific data. Likewise, the system can fine-tune a pretrained embedding model. However, fine-tuning requires examples and access to weights of the embedding model. Yet the system only has access to training data in the form of a limited number of examples of good retrievals. Moreover, the system often does not have access to the weights of the embedding model. Even when the system has access to the weights of the embedding model, the cost and data requirements can be prohibitive.

In one embodiment, the system developed by the inventors solves these issues by applying parameter efficient fine tuning (PEFT). The system instantiates PEFT in the setting (s) by augmenting the embedding model with small "adapters," i.e., small trainable neural networks The new parameters introduced in the adapters are learnt using the limited amount of training data. The internal weights of the embedding model are left untouched (as a "black box"). The adapted embeddings are then used for retrieval. Such an approach is named Adapted Dense Retrieval ("ADR") or ADDER. The ADDER approach is based on tuning the embedding model(s) with the small adapters without changing the embedding model, thereby effectively supporting heterogeneity, strictness requirements, and semantic alignment with task-specific notions of similarity.

In one embodiment, the system developed by the inventors improves RAG by applying the ADDER algorithm to transform query/corpus element embeddings to better support task-specific, heterogeneous and strict retrieval, for example, in combination with prompt generation for LLMs to perform targeted tasks. The system architecture incorporates a specific application of a neural architecture to provide the ADR functionality for embedding adaptation as a part of an improved information retrieval system that is used to prepare relevant prompts to the LLMs.

As used herein, the term "task" refers to any domain-specific retrieval task (e.g., question answering, document search, recommendation, etc.) that may require domain-specific data/knowledge, where a training dataset contains enough examples for retrieving artifacts in the corpus for a specific task (e.g., to find relevant tables based on a calculated column query, to find relevant data/metadata from a workbook in Excel®, to generate code from natural language, etc.). Although various embodiments are described with respect to queries in natural language (e.g., involving events, calendars, weather, places, people, etc.), it is contemplated that the approach described herein may be used with queries in other artifacts such as code (e.g., in domain-specific languages), documentation, structured text, semi-structured text, diagram, chart, image, video, audio, and the like.

A technical benefit of the approach provided herein is improved contextual relevance. A task-specific adapter can tailor embedding model output(s) to the specific task context, leading to more relevant and focused generative model (e.g., LLM) responses. Not only does this improve the productivity of the user, but this approach can also decrease the computing resources required to refine the LLM based on task updates and/or additional user queries to the generative model. Another technical benefit of this approach is versatility. Different adapters can be created/trained for different tasks and applied to various embedding models, thereby supporting various generative model functions from summarizing factual topics to crafting creative text formats like poems or scripts. Another technical benefit of this approach is effective user access to cross-modal corpus element embeddings, such as datasets from natural language to a target programing language.

Another technical benefit of this approach is enhanced efficiency of the embedding models (e.g., research papers) without changing the underlining embedding models. Yet another technical benefit of this approach is increased factual accuracy. By grounding generated content in the factual embedding model data (e.g., expert knowledge), the approach reduces the risk of hallucinations or fabrications of pure generative models. A further technical benefit of this approach is improved quality of content that is retrieved from the context and put in the prompt. The prompt leads to improved generation by a LLM, even when the LLM that is "low quality" (due to being trained on less data). These and other technical benefits of the techniques disclosed herein will be evident from the discussion of the example implementations that follow.

FIG. 1 is a diagram of an example computing environment 100 in which the techniques for providing adapted dense retrieval may be implemented. The example computing environment 100 includes a client device 105 and an application services platform 110. The application services platform 110 provides one or more cloud-based applications and/or provides services to support one or more web-enabled native applications on the client device 105. These applications may include but are not limited to schedule planning assistant applications, presentation applications, website authoring applications, collaboration platforms, communications platforms, and/or other types of applications in which users may create, view, and/or modify various types of content.

In some implementations, the system developed by the inventors attaches an adapter to the black-box embedding model, and the adapter takes the form of a residual adaptation term. Since the adapter is learning a perturbation to be applied to a general-purpose embedding model, it becomes more task and domain specific. The residual adaptation term may be viewed as reminiscent of low rank matrices of low-rank adaptation (LoRA). LoRA has been used to fine-tune large language models by adding low rank matrices to the weight matrices of the original generative model. The low rank matrices can be viewed as perturbations. The residual adaptation term of the system developed by the inventors is different from LoRA, since it does not change any weights of the embedding model (treated as a black box), but instead adds a perturbation to the embedding(s) itself. In some implementations, the system developed by the inventors computes the perturbation (i.e., the residual adaptation term) by passing a general-purpose embedding through a softmax based dictionary lookup. Mathematically, the dictionary lookup looks like a low rank matrix multiplication, but for the fact that there is a softmax layer in between the two matrices. More details are provided as follows.

In the implementation shown in FIG. 1, the application services platform 110 adapts embeddings for custom retrieval according to the techniques described herein. In one embodiment, the application services platform 110 is independently implemented on the client device 105. In another embodiment, the client device 105 and the application services platform 110 communicate with each other over a network (not shown) to implement the system. The network may be a combination of one or more public and/or private networks and may be implemented at least in part by the Internet.

The client device 105 is a computing device that may be implemented as a portable electronic device, such as a mobile phone, a tablet computer, a laptop computer, a portable digital assistant device, a portable game console, and/or other such devices in some implementations. The client device 105 may also be implemented in computing devices having other form factors, such as a desktop computer, vehicle onboard computing system, a kiosk, a point-of-sale system, a video game console, and/or other types of computing devices in other implementations. While the example implementation illustrated in FIG. 1 includes a single client device 105, other implementations may include a different number of client devices that utilize services provided by the application services platform 110.

Figure 2A:
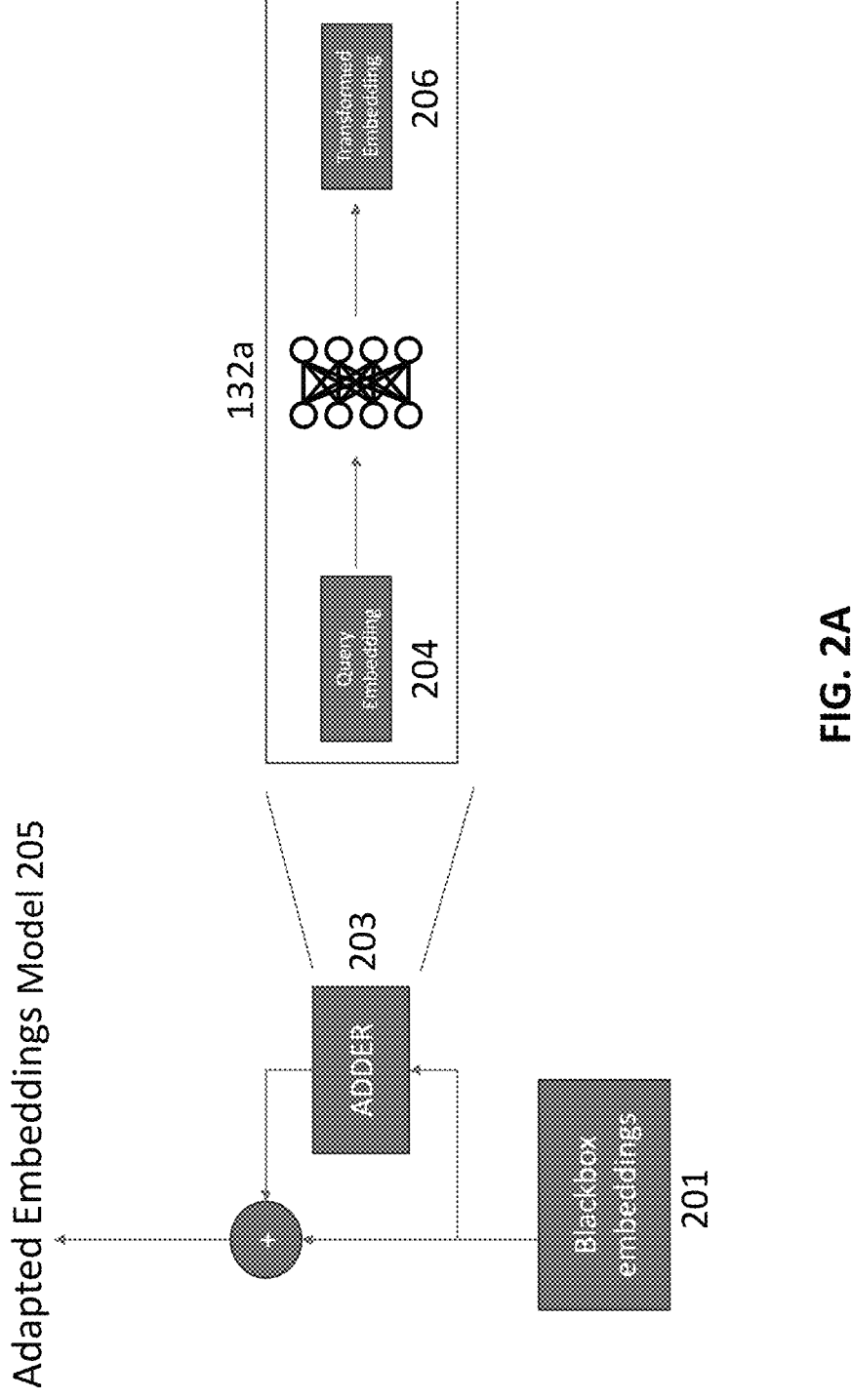
FIGS. 2A-2C are conceptual diagrams of the adapted dense retrieval of the system of FIG. 1.
Figure 2B:
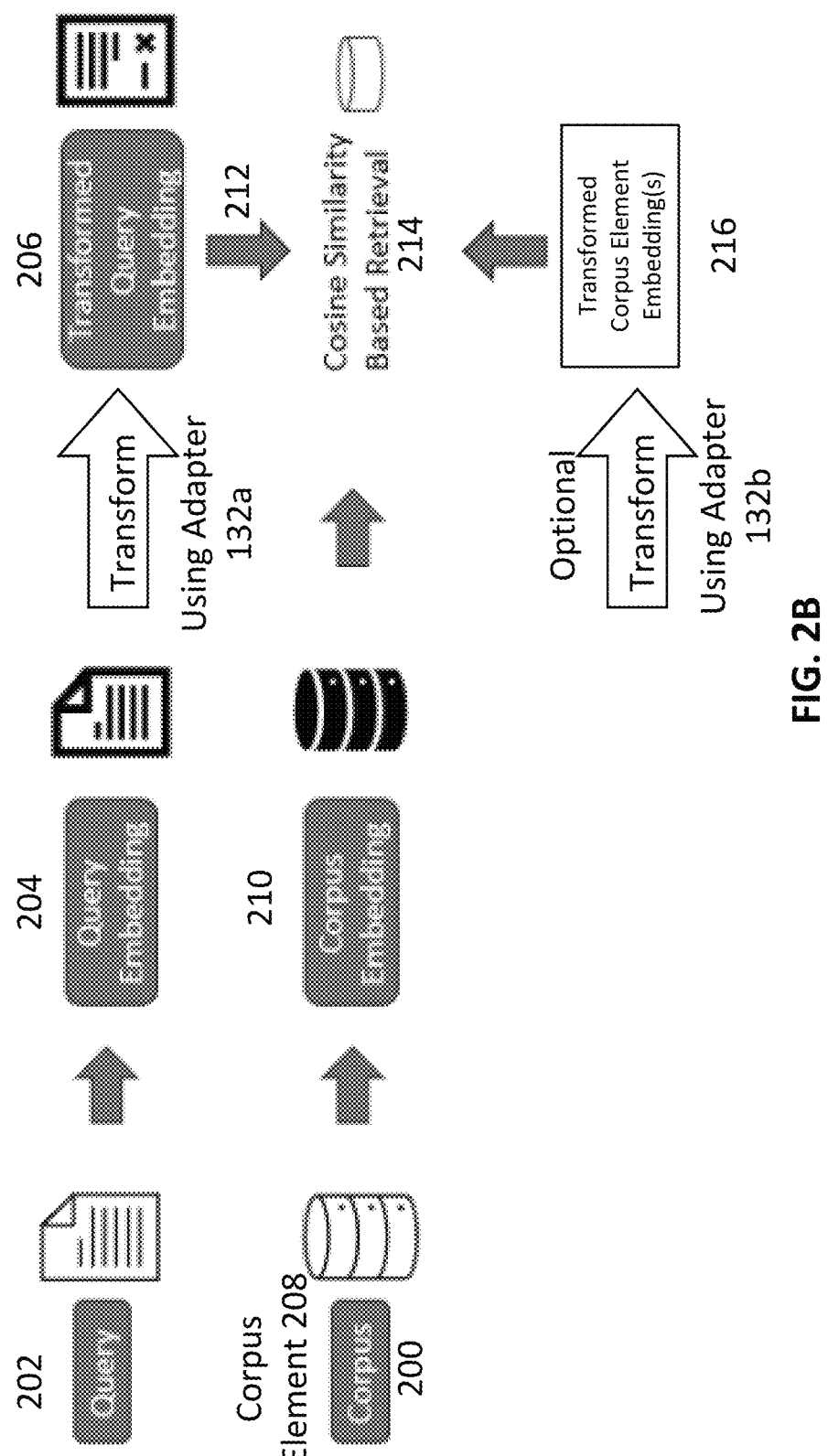
Figure 2C:
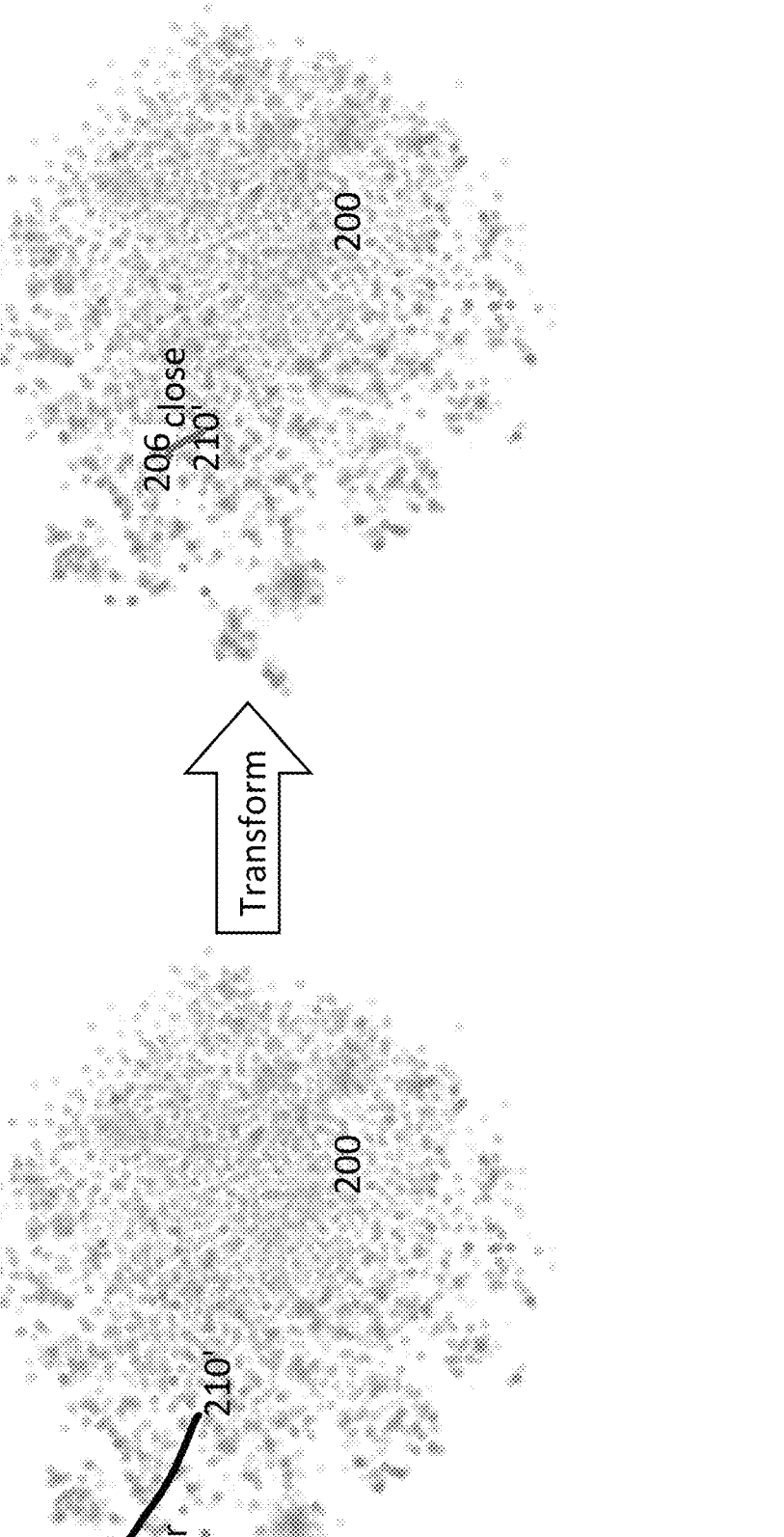

The client device 105 includes a native application 114 and a browser application 112. The native application 114 is a web-enabled native application, in some implementations, which enables users to view, create, and/or modify content as supported by the adapted dense retrieval. The web-enabled native application utilizes services provided by the application services platform 110 including but not limited to creating, viewing, and/or modifying various types of content as supported by the adapted dense retrieval. The native application 114 implements the adapted dense retrieval of the system as shown in FIGS. 2A-2C in some implementations. In other implementations, the browser application 112 is used for accessing and viewing web-based content provided by the application services platform 110. In such implementations, the application services platform 110 implements one or more web applications, such as the browser application 112, that enables users to view, create, and/or modify content as supported by the adapted dense retrieval. The browser application 112 implements a user interface 605 shown in FIG. 6 in some implementations. The application services platform 110 supports both the native application 114 and the browser application 112 in some implementations, and the users may choose which approach best suits their needs.

In one embodiment, the application services platform 110 includes a request processing unit 122, a prompt construction unit 124, a generative model 126, an embedding pre-processing unit 128, an adapter generating unit 130, an adapter zoo 132, and an adapter selecting unit 134. In other embodiments, the application services platform 110 also includes an enterprise data storage 136, and/or moderation services.

FIGS. 2A-2C are conceptual diagrams of the adapted dense retrieval of the system of FIG. 1 according to principles described herein. As shown in FIG. 2A, the system augments an embedding model 201 with an ADDER 203 into an adapted embedding model 205. As mentioned, the ADDER approach is based on tuning the embedding model 201, thereby effectively supporting heterogeneity, strictness requirements, and semantic alignment with task-specific notions of similarity.

In one embodiment, the ADDER 203 is a low rank adapter (e.g., a small adapter 132a among the adapter zoo 132). In another embodiment, the adapter is built for a specific application, such as an Excel® adapter for Excel® (e.g., for a task such as to find relevant tables based on a calculated column query). The parameters introduced in the adapters are learnt using limited amount of training data. For example, the adapter 132a may be a low rank matrix multiplication with a softmax layer in-between two matrices. As such, the internal weights of the embedding model 201 are left untouched (as a "black box"). The adapted embeddings are then used for retrieval.

FIG. 2B depicts a workflow for fine-tunes embeddings using the ADDER approach. In response to a query 202 received via the request processing unit 122, the embedding pre-processing unit 128 coverts the query 202 into a query embedding 204, and then transforms the query embedding 204 into a transformed query embedding 206 using the adapter 132a. The query embedding 204 and/or the transformed query embedding 206 can be saved in the enterprise data storage 136 as a part of the embeddings data 142.

Concurrently, the embedding pre-processing unit 128 coverts a corpus element 208 of a corpus 200 into a corpus element embedding 210, then calculates a cosine similarity in a processing 212 with the transformed query embedding 206, before performing a cosine similarity based retrieval 214.

As shown in FIG. 2C, the embedding pre-processing unit 128 moves the query embedding 204 to be closer to target corpus element embedding(s) 210' in the corpus 200 via transforming the query embedding 204 into the transformed query embedding 206 using an adapter. By calculating a cosine similarity of the transformed query embedding 206 against each of the corpus element embeddings in the corpus 200, the embedding pre-processing unit 128 can identify the top-k corpus element embeddings with optimal cosine similarity to the transformed query embedding 206, as output(s) to the prompt construction unit 124. In other words, the system acts as an information scout, searching through the corpus 200 to find corpus elements aligned with the query 202. For example, given a calculated column in a workbook in Excel®, the system can convert the query and the tables in the workbook into embeddings, transform the query embedding into a transformed query embedding, calculate a cosine similarity between the transformed query embedding and the table embeddings, and retrieve the top-3 tables closest to the query.

Optionally, the embedding pre-processing unit 128 transforms the target corpus element embedding(s) 210' into transformed corpus element embedding(s) 216 using an adapter 132*b*, then calculates a cosine similarity in the processing 212 between the transformed query embedding 206 and the transformed corpus element embedding(s) 216, before performing another cosine similarity based retrieval 214. Since there can be a plurality of target corpus element embeddings to be transformed then calculated for similarity, this optional corpus element transformation causes much more time and computation resources. It depends on the tasks and corpus to determine whether the optional corpus element transformation is desired.

In some implementations, the prompt construction unit 124 combines the query embedding 204 with the top-k corpus element embedding(s) into a meta prompt to send to the generative model 126 for further processing. The generative model 126 can take the top-k corpus element embeddings and weave them into coherent, grammatically correct, and stylistically appropriate output to the query 202, such as a news article, a poem, or a code snippet. In another implementation, the prompt construction unit 124 can work in conjunction with the embedding pre-processing unit 128 to apply adapter(s) to re-rank LLM outputs, to accelerate the process and reduce computational resources.

The embedding pre-processing unit 128 performs query/corpus element embedding transformation using adapter(s) selected from the adapter zoo 132 by the adapter selecting unit 134 based on the query 202 and/or the corpus 200. The adapter can be selected for the query considering the specific field of corpus, the availability of pre-trained adapters, and the like. In one embodiment, the adapter 132*a* is identical to the adapter 132*b* for simplification. In another embodiment, the adapter 132*a* is different from the adapter 132*b*. Depending on the relevant task and corpus, the adapter 132*b* can be adapted for moving the transformed corpus element embedding(s) 216 faster towards the transformed query embedding 206. The adapter generating unit 130 generates/trains adapters then stores the adapters in the adapter zoo 132. More details of the adapter generating unit 130 are discussed in conjunction with FIG. 3.

In some implementations, the adapter generating unit 130 uses a small set of the corpus 200 as training data to learn the adapter weights. Preferably, the training data contains examples of "good" retrievals. Setting a training data point where a query q maps to a corpus element c, the adapter generating unit 130 generates/trains an adapter by enforcing that the adapted/transformed embedding of q be closer to the adapted/transformed embedding of c than to the adapted/transformed embedding of any negative corpus element c'. This may require a determination of what negative example c' to use when processing the data point (q, c). Among several approaches to pick the negative training instances for dense retrieval, the system modifies the approach that suggested taking hard negatives from the full corpus. Specifically, instead of random or in-batch local negatives, the system finds global negatives using the current state of the adapted model on the entire corpus C.

Retrieval is being increasingly used to build applications based on pretrained large language models (LLMs, e.g., GPT-4V). Embeddings from LLMs have been used extensively to support the retrieval component in such applications. Although various embodiments are described with respect to LLMs, it is contemplated that the approach described herein may be used with other generative models, such as large vision models (LVMs, e.g., DALLE-3), large multimodal models (LMMs, e.g., Imagen, CLIP, or the like), etc. In some implementations, the system developed by the inventors introduces a heterogeneous strict retrieval problem beginning with three inputs:

A single query q0 from a domain Q of queries;

A corpus C of candidate items;

A dataset D containing pairs (q, c), where $q \in Q$ and $c \in C$.

The goal is to extract some k>0 elements from C that are most likely to be related to the query q0 in the same way that pairs (q, c) in D are related. The dataset D refers to training data that is used to train an embedding adapter. Such s small dataset D contains examples of "good" retrievals, i.e., D has pairs (q, c) if c is the desired corpus element to retrieve for query q. Each one of the adapters in the adapter zoo 132 is trained using a different dataset D. The adapters are task-specific, such that the system developed by the inventors applies adapter(s) to by the task(s). For instance, the adapter application is hard coded in the system.

As mentioned, the system developed by the inventors prefers to restrict RAG retrieval results to top-k artifacts for a much smaller k (such as top-1, or top-3, or top-5), since LLM prompts have size-limits due to cost and model-induced constraints. The focus is thus on cases where k is required to be small. The term "strict retrieval' emphasizes the fact that the system wants the most likely candidate to appear in the top-1, or top-3, or top-5 of the retrieved candidates (as opposed to being in the top-10 or top-50). In some implementations, the top-k candidates (e.g., the top-1, top-3, or top-5) are passed in the same prompt. In other implementations, among the smaller k approaches, the multi-candidate approach (e.g., top-3 or top-5 takes more LLM calls than top-1) is performed as a fallback, when the single candidate approach (top-1) fails.

The corpus C typically contains a few hundred or a few thousands of elements. Similarly, the dataset D contains a few hundreds or thousands of (q, c) pairs. An advantage of this mechanism over previously used methods is that the current system focuses on heterogeneous retrievals where the domains Q and C are potentially very distinct. For example, the artifacts in Q may be natural language sentences, whereas the artifacts in C may be code snippets, or semi-structured or structured text or data.

Assuming that the system has black-box access to a pretrained LLM that can compute embeddings, $E:(Q \cup C) \rightarrow L$ can be used as the black-box function that supports an entity—either a query q from Q or a corpus element c from C—to compute its representation/embedding E(q) or E(c), respectively, in some (common) latent representation/embedding space L. For example, the system uses the text embedding model OPENAI ADA (e.g., text-embedding-ada-002) as the function E. Text-embedding-ada-002 outperforms older embedding models on text search, code search, and sentence similarity tasks, and obtains comparable performance on text classification.

For instance, the system developed by the inventors can use the text embedding model to compute (general-purpose) embeddings, when the system cannot or does not fine-tune or refine the embedding model in any way. This assumption is reasonable since access the embedding model weights are often restricted, and furthermore, fine-tuning the embedding models can be costly and time prohibitive. Moreover, the system typically has only small amounts of data in set D that may not be sufficient for fine-tuning.

The embeddings computed by pretrained large models are dense (as opposed to sparse), and such embeddings can be used for retrieval. Dense retrieval serves as a baseline for solving the heterogeneous strict retrieval problem(s). Dense Retrieval leverages embedding models to achieve semantic retrieval. Examples of embedding models for dense retrieval include Bidirectional Encoders from Transformers (BERT), sentence-BERT, DistilBERT, and the like. Queries and corpus elements are embedded into the same low-dimensional space. Relevance between query and a corpus element is determined by measuring their similarity (e.g., using a cosine distance or other metrics) between their respective embeddings. Dense retrieval allows for more nuanced relevance modeling compared to traditional keyword-based methods. Advantages of dense retrieval include capturing semantic similarities, efficient searching using approximate nearest neighbor search algorithms, applicable to various tasks, and the like.

For example, the embeddings computed by pretrained large models can be used for retrieval using the following function, retoai (k, q0, C), which retrieves k candidates from the corpus C for a given query q0:

$$ret_{oai}(k, q_0, C) ::= \text{argmax}K_{\{c \in C\}} sim(E(q_0), E(c)) \qquad (1)$$

In equation (1), sim is a measure of similarity between two vectors in the embedding space L. The system uses cosine similarity as the measure; thus, the arg maxK operator is simply returning the k corpus elements that are the k nearest neighbors of E(q0) in the embedding space L.

The embeddings computed by E are general-purpose and can be used as embedding representations for various entities, such as natural language, code, and the like. The function retoai defined in Equation (1) provides a very strong baseline for retrieval, even for heterogeneous strict retrieval, since LLMs have been trained on vast amounts of data. However, it relies on a fixed notion of similarity, rather than a specific notion of similarity of interest. In the system, the set D of pairs of query and corpus elements illustrates the notion of similarity of interest. When the similarity notion implicit in D matches the one induced by E and sim, the dense retrieval (retoai) performs well. On the other hand, when there is a mismatch, the system adapts the embedding so that it captures the semantics used in the relation between the example pairs (q, c) in D.

In this embodiment, Equation (1) uses the same embedding calculator E for both query and corpus for simplicity of presentation. In another embodiment, the system uses different functions, E and E', to embed queries and corpus elements respectively, as long as the embedding space L is shared.

Adapted Dense Retrieval

Dense retrieval adaptation aims to improve the performance of dense retrieval models when applied to a new target domain, where the data distribution differs significantly from the training data (source domain). This is advantageous because while dense retrieval excels at semantic search, it can suffer when the language usage and information structure are not aligned with the target domain. The system addresses the heterogeneous strict retrieval challenge based on adapting the black-box embedding E to the specific notion of similarity presented in the dataset D. For instance, the embedding pre-processing unit 128 adapts the embedding function E by simply composing it with another function Tr:L→L so that the initial query q0 is transformed into Tr(E(q0)). The transformation Tr is learnt by a key-value pair unit 302 from the dataset D, as described later. Thus, the dense retrieval function retoai from Equation (1) is replaced by the following adapted dense retrieval, or ADDER, function retadr (k, q0, C):

$$ret_{adr}(k, q_0, C) ::= \text{argmax}K_{\{c \in C\}} sim(Tr(E(q_0)), E(c)) \qquad (2)$$

Referring back to FIG. 2A, the transformation of the query embedding 204 uses the adapter 132a (e.g., Tr), and the optional transformation of the corpus element embedding 210 uses the adapter 132b (e.g., Tr'). In other words, there is asymmetry in Equation (2) wherein the transformation Tr is applied to only the query embedding 204 in the ADDER. Optionally, the embedding pre-processing unit 128 applies another transformation Tr' on the corpus element embedding 210 to get a variant retadr2 (k, q0, C) of another adapted dense retriever ("ADDER2"):

$$ret_{adr2}(k, q_0, C) ::= \text{argmax}K_{\{c \in C\}} sim\left(Tr(E(q_0)), Tr'^{(E(c))}\right) \qquad (3)$$

Then after, the ADDER approach retrieves the k nearest neighbors of the transformed query embedding(s) 216. The purpose of the transformations Tr and Tr' is to capture any task-specific adaptations required on the query/corpus element embedding before the query/corpus element embedding is used for a nearest neighbor search.

The overall approach of adapted dense retrieval can work with transformations Tr and Tr' taken from any rich class of transformation(s), such as 1-layer neural networks, 2-layer neural networks, 3-layer neural networks, or other more complex neural architectures. The embedding pre-processing unit 128 starts with very simple classes of transformations for picking Tr and Tr', as follows.

Key-Value Lookup Based Residual Adaptations

Inspired by low-rank adaptations for fine-tuning large language models, the system uses residual adaptation for the transformation functions Tr and Tr'. Specifically, the two transformations add a residual term to the corpus element embedding e computed by the black-box embedding model:

$$Tr(e) ::= e + f(e, \theta) \qquad (4)$$
$$Tr'^{(e)} ::= e + f'(e, \theta')$$

The functions f and f' are parameterized by θ and θ' respectively that are learned from the dataset D. The neural architecture for computing f and f' is inspired by a key-value dictionary lookup in an attention mechanism. In an attention mechanism for an embedding model, a key-value dictionary lookup determines how relevant specific parts of the input are to the current processing step. Taking attention word embedding (AWE) as an example, the query is a sentence represented by a sequence of embedded vectors. Words used in similar context are relatively close to each other compared to the other words in the embedding model.

The attention mechanism focuses on specific parts of the sentence for a particular task, such as predicting the next word or summarizing the main idea, by carefully selecting the relevant words from the sentence. Each embedded vector encodes various semantic and syntactic information about the corresponding word. Each embedded vector holds two hidden components: key and value. The key acts like a clue hinting at the word's importance, while the value holds the actual information to be used later. A query vector is created for each step of the attention mechanism. The existing attention mechanism compares a query vector with each key vector in the sentence through a similarity function to generate an attention score, representing how well the key matches the query. The attention scores determine how much weight each value should have in the final output(s). High scores indicate relevant information, while low scores get "ignored" by the existing attention mechanism. A weighted average of all value vectors is calculated using the attention scores as weights. This weighted sum becomes the output of the attention mechanism, focusing on the most relevant parts of the sentence for the specific task. Key-value lookup in attention mechanisms allows the generative model to dynamically focus on specific parts of the input based on their relevance to the current task. The query vector guides the attention, while the key-value pairs within each embedded vector provide clues and information about the individual words. Attention models can "look" at the entire sentence simultaneously. In one embodiment, multiple attention heads are used in parallel, each learning different aspects of the sentence through separate key-value comparisons and queries. The design of the similarity function and the specific attention architecture can impact the focus and effectiveness of the model.

Rather than changing weights of the corpus elements of an embedding model as the existing approach (e.g., AWE), the embedding pre-processing unit 128 adds a perturbation to the embedding itself using a key-value pair of a task-specific adapter. In one embodiment, the embedding pre-processing unit 128 computes the perturbation (i.e., the residual adaptation term) by passing a general-purpose embedding through a softmax based on the key-value pair. The adapter selecting unit 134 retrieves the key-value pair via a dictionary lookup in the adapter zoo 132.

For example, the embedding pre-processing unit 128 uses the key-value pair to calculate the similarity function thereby selecting the top-k number of corpus elements as more relevant to the query, then sending the top-k number of corpus elements to the request processing unit 122 and then to the prompt construction unit 124 for later processing by the generative model 126 (e.g., in preparing prompts for the generative model 126 to perform targeted tasks).

The following mathematical calculation focuses on f, and f' can be handled the same way as f. The function f is computed by extrapolating from a table that contains mapping from keys (i.e., inputs of f) to values (i.e., outputs of f). Concretely, let d be the dimension of the latent space L, where the embeddings computed by the black-box embedding model reside. For example, for OpenAI ADA embeddings, d is 1536. Let $h < d$ be a small number compared to d. In one embodiment, the values the system uses for h range from 16 to 128. K is a $(h \times d)$-matrix of keys (containing h keys), and V is a $(h \times d)$-matrix of values (containing h values). The matrices K, V define the unknown parameters $\theta$. Given the input embedding e (of shape $(1 \times d)$), the function f is defined as:

$$f(e, \theta) = f(e, (K, V)) = \text{softmax}(eK^T)V \qquad (5)$$

where $K_T$ is the transpose of K. It should be noted that since $h < d$, even though the final residual term is d dimensional, all residuals technically lie in some smaller h dimensional space. The low-dimensional residuals are reminiscent of low-rank adaption. However, unlike the low-rank adaption, the system treats the embedding model as a black-box and does not adapt the weights of the embedding model.

The system, thus, parameterizes f (and f') by 2dh unknowns. In addition, the system uses a loss function to learn the unknown parameters K, V from the given dataset D containing pairs (q, c) of query q and corpus element c as follows.

Global Negatives Contrastive Loss

Figure 3:
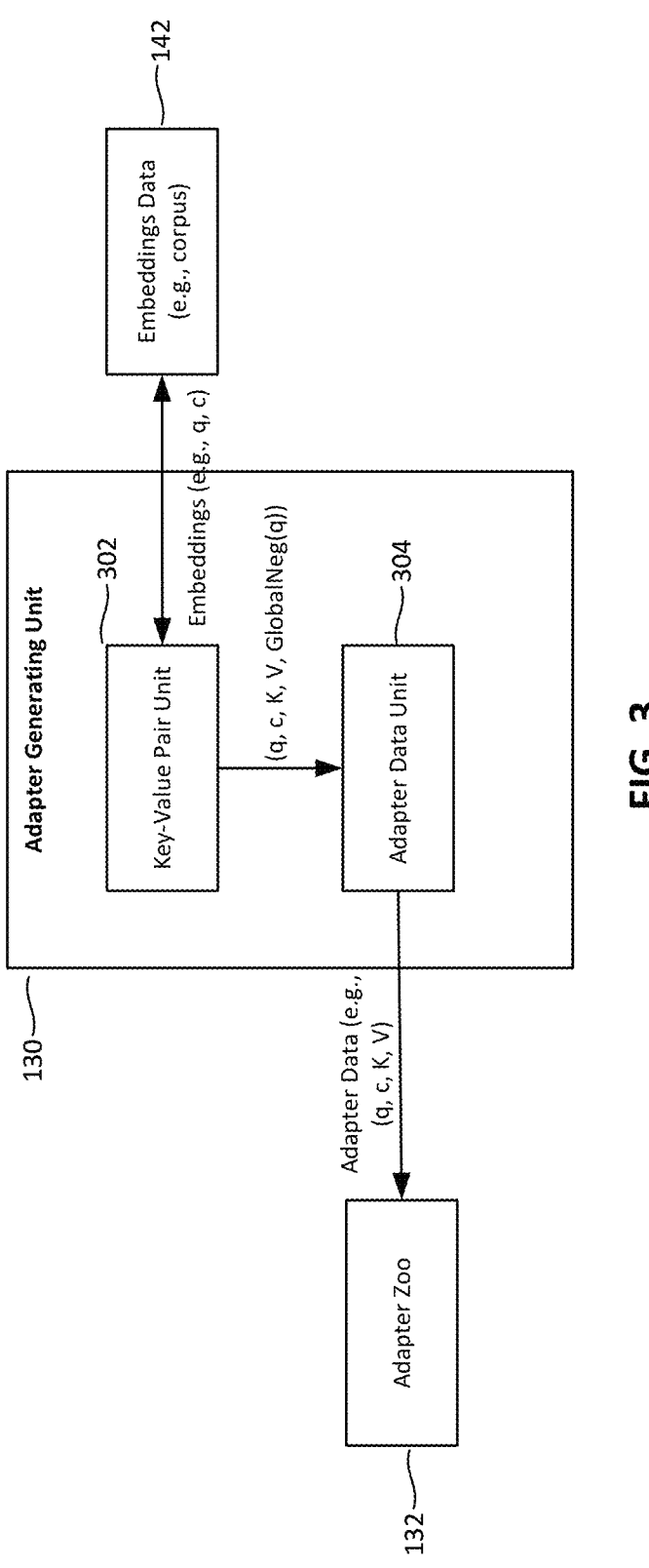
FIG. 3 is a diagram showing additional features of an adapter generating unit of the application services platform shown in FIG. 1.

FIG. 3 is a diagram showing additional features of the adapter generating unit 130 of the application services platform shown in FIG. 1. The adapter generating unit 130 includes the key-value pair unit 302 and an adapter data unit 304. The key-value pair unit 302 determines key-value pairs that forms a look up dictionary for task-specific adapters. The key-value pair unit 302 learns the parameters K, V (i.e., $\theta$ in short) for the transformation function Tr to obtain the adaptive dense retriever in Equation (2), and additional parameters K', V' (i.e., $\theta'$ in short), for the transformation function Tr' to obtain the adaptive dense retriever in Equation (3). The key-value pair unit 302 passes K, V, K', V' to the adapter data unit 304.

The dataset D contains pairs (q, c), so for each q in the dataset, the key-value pair unit 302 has examples of corpus elements c to be retrieved from the embeddings data 142 in the enterprise data storage 136. Every other corpus element becomes a negative example. In other words, for query q, the positive corpus elements Cq+ and the negative elements Cq− are defined as follows:

$$C^{q+} ::= \{c \in C \mid (q, c) \in D\} \qquad (6)$$

$$C^{q-} ::= C \backslash C^{q+} \qquad (7)$$

Assuming g(q, c) is the function used in the adapted dense retriever and g(q, c) is computed by a neural network with a 2-layer architecture (i.e., one hidden layer plus one output layer/softmax classifier), g(q, c) can be calculated as follows:

$$g(q, c) ::= sim(Tr(E(q)), Tr'(E(c))) \qquad (8)$$

Learning to retrieve is like learning to rank, and hence, to learn the best possible g for retrieval, the key-value pair unit 302 minimizes the loss over all pairs of positive and negative samples for a query as follows:

$$\theta^*, \theta'^* ::= \text{argmin}_{\theta, \theta'^*} \sum_{(q,c) \in D} \sum_{c \in C^{q-}} l(Tr(E(q)), Tr'(E(c)), Tr'(E(c^-))) \qquad (9)$$

If e:=Tr(E(q)), e+:=Tr' (E(c)), and e−:=Tr' (E(c−)), then the loss function l(e, e+, e−) should be zero when e is closer to e+ than e is to e− and e should be positive otherwise. Since the set Cq− can be very large, the system uses approximates sampled from this set in place of Cq− in Equation (9). In one embodiment, the sample is restricted to the corpus elements in the batch being processed. However, this leads to poor learning, thus requiring finding negative samples from the full corpus. The key-value pair unit 302 thus picks the negative corpus element that was closest to the query embedding as the negative sample to use in Equation (9). In other words, the key-value pair unit 302 modifies Equation (9) as follows:

$$\theta^*, \theta'^* ::= \tag{10}$$

$$\operatorname{argmin}_{\theta, \theta'^*} \sum_{(q,c) \in D} l(Tr(E(q)), Tr'(E(c)), Tr'(E(GlobalNeg(q))))$$

where the function GlobalNeg is computed as follows:

$$GlobalNeg(q) ::= \operatorname{argmax}_{c \in C^{q-}} sim(Tr(E(q)), Tr'(E(c))) \tag{11}$$

Note that a preferred negative sample, GlobalNeg(q), for query q depends on the transformation functions Tr and Tr' learned from the dataset D. Thus, the key-value pair unit 302 calculates GlobalNeg(q) during training in every batch. Since the system uses relatively small training datasets and modest corpus sizes, the calculation consumes modest time and resources. The key-value pair unit 302 passes the GlobalNeg(q) to the adapter data unit 304.

The adapter data unit 304 saves the adapter data (e.g., q, c, K, V, K', V', GlobalNeg(q)) for a specific task as an adapter in a lookup table in the adapter zoo 132. The adapter selecting unit 134 can select a matching adapter from the adapter zoo 132 for a specific task, thereby significantly improving retrieval performance in a new domain, making dense retrieval more versatile and applicable to the specific task. The effectiveness of an adapter for a specific task depends heavily on the quality of the chosen dataset D and its alignment with the specific domain shift. Each adapter has its own strengths and limitations, and the optimal choice of an adapter depends on factors like the query, the task-specific target domain characteristics, etc.

Results Evaluation

The inventors used the system to experimentally evaluate adapted dense retrievals to determine how to apply the ADDER of the Equation (2) and the ADDER2 of the Equation (3) to add value over off-the-shelf OPENAI ADA (text-embedding-ada-0021) embeddings ("OAI" as the baseline). The experiments were carried out using regular laptops and desktops, rather than any special purpose hardware for training or inference except for the black-box rest API calls to the OpenAI embedding endpoint. In particular, the system uses a virtual machine with a single Nvidia K80 GPU (with 24GiB of vRAM), 4 CPU cores and 28 GB of RAM. The optimization is done using the Adam optimizer for both ADDER and ADDER2.

For training the ADDER, the system started an initial learning rate of 1e−3 with a step update of γ=0.5 every 100 epochs. The approach to training the ADDER with the specified learning rate schedule includes the following. (1) Import necessary libraries (e.g., TensorFlow or PyTorch) for model creation, data handling, and optimization. (2) Define the embedding model by specifying the input and output layers, choosing appropriate embedding layers for textual data, incorporating additional layers (e.g., dense layers, attention) as needed, and defining a loss function (e.g., cross-entropy for classification tasks). (3) Prepare the dataset in a format suitable for the model and split the data into training and validation sets to monitor performance during training. (4) Instantiate an optimizer (e.g., Adam or SGD), and set the initial learning rate to 1e−3. (5) Implement a learning rate scheduler that decrease the learning rate by a factor of 0.5 (γ=0.5) every 100 epochs, and update the optimizer's learning rate accordingly at the end of each epoch. (6) Train the Model by starting the training loop for each epoch on a batch of training data, and calculating the loss on the validation set. If the current epoch is a multiple of 100, call the learning rate scheduler to update the learning rate. (7) Monitor progress and adjust hyperparameters by tracking training and validation loss/accuracy metrics during training, adjust hyperparameters (e.g., learning rate, batch size) if needed to improve performance, and considering early stopping if validation performance plateaus or degrades. (8) Save the trained model (e.g., the model's weights and configuration) for future use. Table 1 contains example TensorFlow-like pseudocode for the approach.

TABLE 1

```
import tensorflow as tf
# ... define model architecture ...
optimizer = tf.keras.optimizers.Adam(learning_rate=1e−3)
def scheduler(epoch):
    if epoch % 100 == 0:
        lr = optimizer.learning_rate * 0.5
        optimizer.learning_rate.assign(lr)
model.compile(optimizer=optimizer, loss='categorical_crossentropy',
metrics=['accuracy'])
model.fit(train_data, epochs=400, callbacks=[scheduler]) # Example
training for 400
epochs
```

In the experimentation, for training the ADDER2, the system started with a learning rate of 1e−2 and a step update with γ=0.5 every 50 epochs. The training for all cases was terminated after 500 epochs (although learning saturated in most cases well within the terminal limit). In the example experiment, the best embedding model weights were determined using hyperparameter tuning in a range of hidden layer dimensions between 64 and 1536.

ADDER Improves Retrieval on Certain IRBenchmarks

The system first evaluates adapted dense retrieval on classical retrieval benchmarks, such as BEIR (Benchmarking-IR). FIG. 4 are tables showing benchmarks for evaluating adapted dense retrieval of the system of FIG. 1.

BEIR is a powerful and robust benchmark for evaluating information retrieval (IR) models, and BEIR offers a collection of more than eighteen publicly available datasets covering various text retrieval tasks and domains. BEIR facilitates comparisons between custom dense retrieval models and ten pre-trained systems, including lexical, sparse, dense, late-interaction, and re-ranking architectures. Examples of tasks included in BEIR include fact checking (e.g., SciFact), citation prediction, duplicate question retrieval, argument retrieval (e.g., ArguAna), news retrieval, question answering (e.g., FiQA), tweet retrieval, biomedical information retrieval, entity retrieval, and the like. In particular, the system focuses on four smallest datasets in BEIR: SciFact, ArguAna, FiQA and NFCorpus as shown in Table 2 in FIG. 4. They align with the system's focus on tasks where there was limited data. They are also a reasonably diverse set of heterogeneous retrieval use cases. SciFact assesses the veracity of scientific claims from scientific publications. ArguAna retrieves relevant arguments from a large corpus of text given a query topic. FiQA (Factoid Question Answering) focuses on open-domain, factual questions. NFCorpus is a multi-faceted task that involves both entity linking and fact-checking.

In BEIR, a "dev test" refers to a designated portion of a dataset specifically used for development and validation purposes, as opposed to final evaluation. The dev test was used to train the model in case of NFCorpus. ArguAna and contained only a test set. The system did an 80-20 split of the test set to create train-test partitions. OAI needs no training for retrieval, while ADDER and ADDER2 were trained on the particular training sets, and all were evaluated on the test set.

Table 3 presents the standard "normalized discounted cumulative gain" (nDCG) values at k=1, k=3, k=5, and k=10 for the 4 benchmarks and the 3 systems. SciFact and ArguAna datasets associate only one corpus element with any query. Hence, for these two cases, nDCG@k can only increase with k. That is not true for the FiQA and NFCorpus. As shown in Table 3 in FIG. 4, both ADDER and ADDER2 perform better than OAI on SciFact and ArguAna in terms of the nDCG metrics@1, 3, 5. For FiQA and NFCorpus, ADDER and ADDER2 cannot add much value over OAI and mostly perform almost as good as OAI.

The results show that the adapted dense retrieval improves performance of black-box pretrained embedding models by learning a transformation customized to a particular retrieval task. This tuning of the pretrained embedding does not require huge amounts of training data. Task-specific adaptation helps when the training set contains enough examples of retrieving the various artifacts in the corpus. In cases where the adapted dense retrieval does not improve performance metrics, adaptation does not make the metrics much worse and performance remains almost at par with the black-box embedding model.

The system hypothesizes that the differences in gains achieved by ADDER and ADDER2 across benchmarks is due to the differences in alignment of the notion of semantic similarity learnt by OPENAI ADA with what is intended in the benchmarks. For example, SciFact uses very stylized queries and the notion of similarity is that the query is either supported by or refuted by the corpus text. The adapter is possibly able to tweak the embeddings to match the benchmark intention for this set. The notion of similarity is closer to natural language semantic similarity for NFCorpus, so there is little opportunity to gain by adaptation.

ADDER Significantly Improves NL2X Retrievals

The system next evaluates the adapted dense retrieval on heterogeneous tasks where the query is in natural language, but the corpus elements are code fragments. The hypothesis is that adaptation will help more in these cases since the query and corpus elements are different kinds of entities. While the BEIR benchmarks were also heterogeneous, the query and corpus were both natural language expressions. A second interesting goal here is to study the impact of the popularity of the programming language on the performance of baseline embeddings and the adapted embeddings.

The system picked three NL2X datasets from the public domain. NL2X datasets are a special category of datasets designed for tasks that involve transforming natural language input (NL) into structured output (X). Examples of natural language inputs include text, such as questions, commands, descriptions, and the like. Examples of structured data outputs include code snippets, SQL queries, logical forms, mathematical expressions, graph structures, tabular data, and other structured representations. Example NL2X tasks include code generation, text-to-SQL, semantic parsing, math word problem solving, knowledge base population, text-to-graph generation, and the like.

The three target languages X were SMCALFLOW, BASH, and PYTHON. These language cover the spectrum from low resource, special-purpose, and less-known language, SMCALFLOW, on one end to popular, general-purpose and widely-used language, PYTHON, on the other end, with BASH somewhere in the middle. The NL2SMCALFLOW benchmark consists of user utterances (in natural language) about tasks involving calendars, weather, places, or people, which is paired with an executable dataflow program written in lisp-like syntax. The NL2BASH benchmark consists of natural description of a task paired with a bash command that accomplishes that task. The NL2PYTHON benchmark comes from data collected from StackOverflow, and contains pairs of natural language and aligned code (in PYTHON). Each benchmark has a well-defined train and test split provided.

The three natural language to code (NL2X) benchmarks were originally created for the task of generating code from natural language. Here, the inventors repurposed the benchmarks for retrieval: given the natural language utterance and the corpus of program expressions, retrieving the code corresponding to the natural language utterance. This retrieval task was motivated by few-shot selection to achieve optimal performance with limited labeled data. Some strategies of few-shot selection include the following. (1) Diversity: Choose examples that represent the variety of potential queries and documents you expect to encounter. This ensures the model learns a broad range of semantic relationships. (2) Informativeness: Prioritize examples that are clearly relevant and unambiguous, providing strong signals for the model to learn from. (3) Hardness: Include some challenging examples that push the model's boundaries and help it learn to discriminate subtle semantic differences. (4) Active Learning: Continuously query the model for its "uncertainty" about specific examples and prioritize those for labeling, effectively guiding the selection process.

For code generation from natural language tasks, the system picks those NL-Code pairs as few-shots, where the code is most similar to the code expected from the natural language query. Any progress on the repurposed task will facilitate few-shot selection.

As in BEIR benchmarking, the system solves this retrieval task using OPENAI ADA embeddings (OAI), or adapt the embeddings using the training set and then use them for retrievers ADDER and ADDER2. Table 4 in FIG. 4 presents the results of retrieving code from the test set given the corresponding natural language utterance from the test set.

For a query of keeping only the 10 longest questions, OAI retrieved by combining two questionnaires into one table, then retrieving the first 10 rows from the combined table. The ADDER retrieved by removing duplicates from the combined table, sorting the combined table by column and then returning the first 10 unique rows.

For a query of appending.html to the column when a column "URL" does not end with ".html," OAI retrieved by adding a new column to the combined table called "End-String" and filling it with "nofollow" followed by "</a></td>." The ADDER retrieved by adding a column to the combined table called Right, and for each row, if the header ends with W, then a value was determined to be W, otherwise the value was determined to be null.

For NL2SMCALFLOW, both ADDER and ADDER2 provide a significant gain over OAI in the nDCG@k metric for all values of k. The gains are also applicable for NL2BASH benchmark, but are more muted. The gains disappear for NL2PYTHON (CONALA), and OAI starts out-performing ADDER and ADDER2, yet only by a slight margin, for small values of k.

There are a few reasons why OPENAI ADA embeddings do well on the CONALA dataset. The first reason is that the target language is PYTHON, and the pretrained embedding models are known to be fairly good at Python. The second reason is that the natural language descriptions of the PYTHON code are of very high quality. The CONALA dataset contains "cleaned up" versions of the original natural language annotation extracted from STACKOVERFLOW. These natural language descriptions were fixed by humans whenever they were found to not describe the code accurately. Since the natural language describes the code fairly accurately, such that its embedding (computed by OPENAI ADA embeddings) is naturally very close to the embedding of the associated PYTHON code, there is not much space for ADDER and ADDER2 to improve. The system developed by the inventors uncovered that the mapping from natural language to PYTHON code in the CONALA dataset is one-to-many. ADDER and ADDER2 can work with one-to-many relations, after the dataset is prepared by collecting possible corpus elements that correspond to the same query.

In contrast to PYTHON, SMCALFLOW is an unfamiliar target and the OPENAI ADA model does not do as well on embedding those programs. Furthermore, the train-test split in the SMCALFLOW benchmark is such that the train set contains good representatives for the test queries, and hence, ADDER and ADDER2 perform extremely well.

The RAG approach of the system uses a simple architecture with a hidden layer having a small dimension to avoid overfitting, and trains with small datasets that consume less time and computation resources while obtaining accuracy comparable or exceeding the benchmarks.

Figure 8:
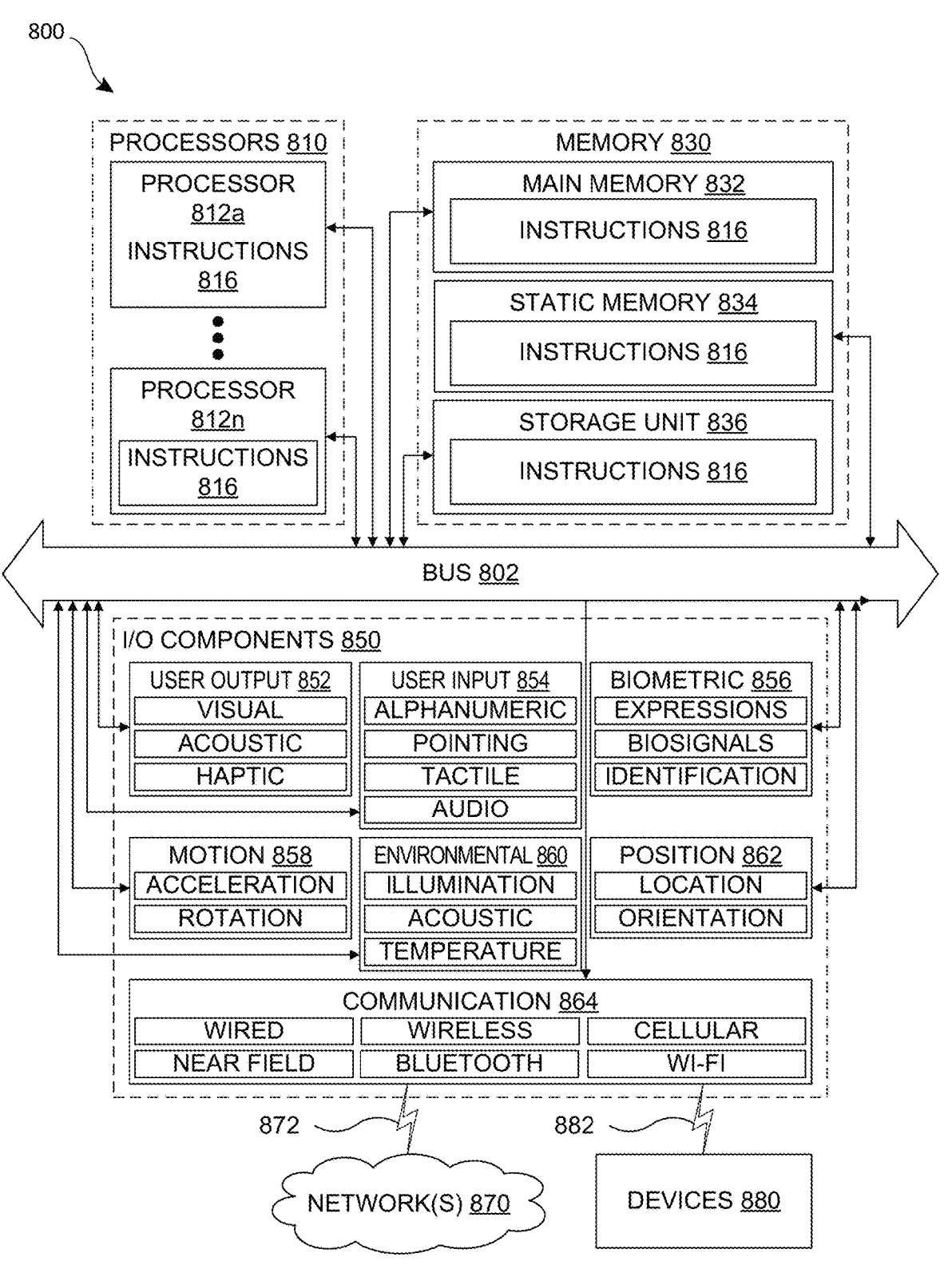
FIG. 8 is a block diagram showing components of an example machine configured to read instructions from a machine-readable medium and perform any of the features described herein.

FIG. 5 is a flow chart of an example process 500 for providing adapted dense retrieval according to the techniques disclosed herein. The process 500 can be implemented by the application services platform 110 or its components shown in the preceding examples. The process 500 may be implemented in, for instance, the example machine including a processor and a memory as shown in FIG. 8. As such, the application services platform 110 can provide means for accomplishing various parts of the process 500, as well as means for accomplishing embodiments of other processes described herein in conjunction with other components of the example computing environment 100. Although the process 500 is illustrated and described as a sequence of steps, it is contemplated that various embodiments of the process 500 may be performed in any order or combination and need not include all the illustrated steps.

Figure 6:
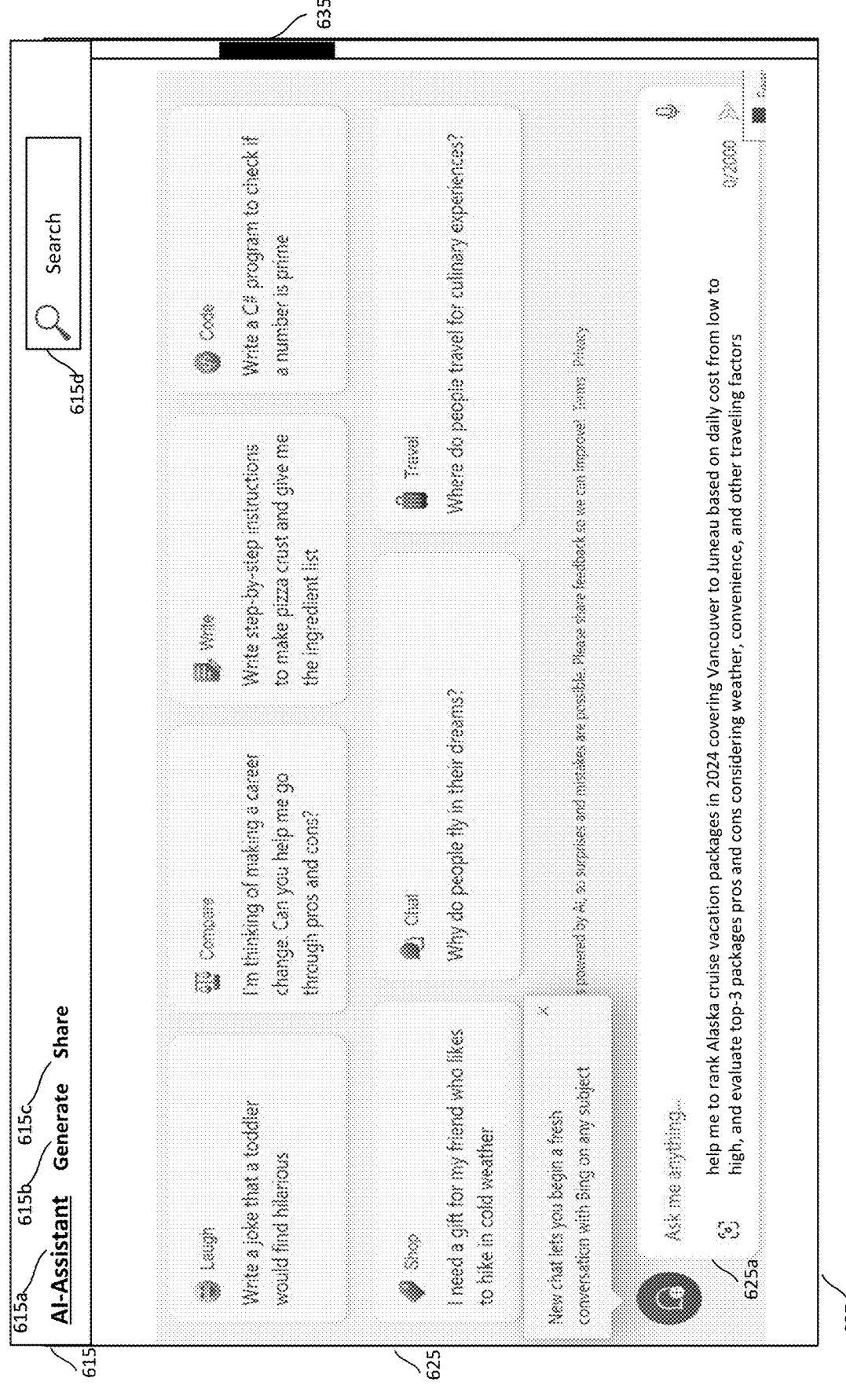
FIG. 6 is a diagram of an example user interface of an AI assistant application that implements the techniques described herein.

In one embodiment, for example, in step 502, the request processing unit 122 receives, via a user interface (e.g., the user interface 605 in FIG. 6) of a client device (e.g., the client device 105), a query (e.g., q0 in Equations (1)-(3), the query 202 in FIG. 2B, or the user prompt in FIG. 6) to a large language model (e.g., ChatGPT), wherein the LLM works in conjunction with an embedding model (e.g., the black box embedding model 201 in FIG. 2A) comprising a corpus (e.g., C in Equations (1)-(3), (6)-(7) and (11), or the corpus 200 in FIGS. 2B-2C) of artifacts. For instance, an artifact of the query (e.g., q0) is different from artifacts of the corpus (e.g., C), and wherein the artifacts of the corpus (e.g., C)

comprise at least one of code, documentation, structured text, semi-structured text, data, or artifacts in domain-specific languages.

In step 504, the embedding pre-processing unit 128 converts the query (e.g., q0) into a query embedding (e.g., E(q0) in Equations (1)-(3), or the query embedding 204 in FIG. 2B). In step 506, the embedding pre-processing unit 128 transforms the query embedding into a transformed query embedding (e.g., Tr(E(q0), or the transformed query embedding 206 in FIG. 2B) in Equations (2)-(3)) using a first transformation function (e.g., Tr in Equations (2)-(3), and (8)-(11), or the ADDER 203 in FIG. 2A, or the adapter 132a in FIG. 2B). In one embodiment, the first transformation function (e.g., Tr) adds a first residual term (e.g., f(E(q0), θ) in Equation (4)) to the query embedding (e.g., E(q0)). The first residual term (f(E(q0), θ)) is specific for a task associated with the query (q0).

In one embodiment, the embedding pre-processing unit 128 models a parameter (e.g., θ) of the first residual term (e.g., f(E(q0), θ)) as a pair of matrices including a first matrix of keys (e.g., K in in Equation (5)) and a first matrix of values (e.g., V in Equation (5)). In another embodiment, the embedding pre-processing unit 128 models the parameter (e.g., θ) of the first residual term (e.g., f(E(q0), θ)) as multiple matrices K1, V1, K2, V2, or the like.

To generate/train the adapter for the task, the adapter generating unit 130 selects a training dataset (e.g., D containing pairs (q, c), where q∈Q and c∈C). For instance, the training dataset (e.g., D) comprises examples for retrieving artifacts in the corpus for the task. In one embodiment, the adapter generating unit 130 determines respective one or more of the matrix of keys (e.g., K) and respective one or more of the matrix of values (e.g., V) for the task based on minimizing a loss function (e.g., Equation (9)) over all pairs of positive and negative corpus elements (e.g., c, c−) for each query (e.g., q) in the training dataset (e.g., D), where the loss function (e.g., Equation (9)) is based on transformed query embeddings (e.g., Tr(E(q))).

In another embodiment, the adapter generating unit 130 modifies the loss function (e.g., Equation (9)) to a modified loss function (e.g., Equation (10)) by replacing the negative corpus elements (e.g., c−) in the loss function (e.g., Equation (9)) with a negative corpus element (e.g., GlobalNeg(q)) that is closest to the query (e.g., q), and determines respective one or more of the matrix of keys (e.g., K) and respective one or more of the matrix of values (e.g., V) for the task based on minimizing the modified loss function (e.g., Equation (10)) over all pairs of positive and negative corpus elements (e.g., c, c−) for each query (e.g., q) in the training dataset (e.g., D).

In step 508, the embedding pre-processing unit 128 measures a first similarity (e.g., a cosine similarity in Equation (2), or the processing 212 in FIG. 2B) between the transformed query embedding (e.g., Tr(E(q0))) and a plurality of corpus element embeddings (e.g., E(c) in Equations (2)-(3), and (8)-(11)) in an embedding space (L) of the embedding model. In one embodiment, the artifacts are converted using a second embedding calculator (e.g., E') that is different from a first embedding calculator (e.g., E) that converts the query. In another embodiment, the artifacts are converted using an embedding calculator (e.g., E) that converts the query.

In step 510, the embedding pre-processing unit 128 determines one or more first top-rated corpus elements (e.g., the top-1, top-3, or top-5) associated with the plurality of corpus element embeddings based on the first similarity (e.g., the cosine similarity based retrieval 214 in FIG. 2B). For instance, the one or more first top-rated corpus elements are nearest neighbors of the transformed query embedding (e.g., $Tr(E(q0))$) in the embedding space (e.g., L) of the embedding model.

In step 512, the embedding pre-processing unit 128 incorporates the one or more first top-rated corpus elements into the query as a prompt to the LLM to generate a response to the query. In step 514, the request processing unit 122 provides, via the user interface (e.g., the user interface 605 in FIG. 6), the response.

In some implementations, the embedding pre-processing unit 128 also transforms the set of corpus element embeddings (e.g., E(c) in Equations (1)-(3), or the corpus element embedding 210 in FIG. 2B) into a set of transformed corpus element embeddings (e.g., Tr' (E(c)) in Equations (2)-(3), or the transformed corpus element embedding(s) 216 in FIG. 2B) using a second transformation function (e.g., Tr' in Equations (2)-(3), or the ADDER2, or the adapter 132$b$ in FIG. 2B), wherein the second transformation function (e.g., Tr') adds a second residual term (e.g., f' (E(c), θ') in Equation (4)) to the set of corpus element embeddings (e.g., E(c)), and wherein second residual term (f' (E(c), θ')) is specific for the task. The embedding pre-processing unit 128 calculates a second similarity (e.g., Equation (3)) between the transformed query embedding and the set of transformed corpus element embeddings (e.g., Tr' (E(c))). For instance, the one or more second top-rated corpus elements are nearest neighbors of the transformed query embedding (e.g., $Tr(E(q0))$) in the embedding space (e.g., L) of the embedding model.

The embedding pre-processing unit 128 obtains for the query one or more second top-rated corpus elements associated with the set of transformed corpus element embeddings based on the second similarity, provides to the LLM the one or more second top-rated corpus elements to generate another response to the query, and provides, via the user interface (e.g., the user interface 605 in FIG. 6), the response.

The embedding pre-processing unit 128 models a parameter (e.g., θ') of the second residual term (e.g., f(E(q0), θ')) as a pair of matrices including a second matrix of keys (e.g., K') and a second matrix of values (e.g., V').

In one embodiment, the adapter generating unit 130 determines respective one or more of the matrix of keys (e.g., K') and respective one or more of the matrix of values (e.g., V') for the task based on minimizing the loss function (e.g., Equation (9)) over all pairs of positive and negative corpus elements (e.g., c, c−) for each query (e.g., q) in the training dataset (e.g., D). The loss function (e.g., Equation (9)) is based on transformed query embeddings (e.g., Tr'(E (q))), transformed positive corpus element embeddings (e.g., Tr' (E(c))), and transformed negative corpus element embeddings (e.g., Tr' (E(c−))).

In another embodiment, the adapter generating unit 130 modifies the loss function (e.g., Equation (9)) into a modified loss function (e.g., Equation (10)) by replacing the negative corpus elements (e.g., c−) in the loss function (e.g., Equation (9)) with a negative corpus element (e.g., Global-Neg(q)) that is closest to the query (e.g., q), and determines respective one or more of the matrix of keys (e.g., K') and respective one or more of the matrix of values (e.g., V') for the task based on minimizing the modified loss function (e.g., Equation (10)) over all pairs of positive and negative corpus elements (e.g., c, c−) for each query (e.g., q) in the training dataset (e.g., D).

FIG. 6 is a diagram of an example user interfaces of an AI assistant application that implements the techniques described herein. The example user interface shown in FIG.

6 is a user interface of an AI-based chatbot, such as but not limited to Microsoft Copilot®. However, the techniques herein for providing adapted dense retrieval are not limited to use in the AI assistant application and may be used to generate content for other types of applications including but not limited to presentation applications, website authoring applications, collaboration platforms, communications platforms, and/or other types of applications in which users create, view, and/or modify various types of task schedules. Such applications can be a stand-alone application, or a plug-in of any application on the client device 105, such as the browser application 112, the native application 114, and the like. For example, the system can work on the web or within a virtual meeting and collaboration application (e.g., MICROSOFT TEAMS®) or an email application (e.g., OUTLOOK®). The application services platform 110 can be integrated into the MICROSOFT VIVA® platform or could work within a browser (e.g., WINDOWS® EDGE®), or MICROSOFT COPILOT®. The application services platform 110 can also work within a website chat functionality (e.g., the BING® chat functionality).

FIG. 6 shows an example of the user interface 605 of an AI-assisted application in which the user is interacting with an AI generative model to generate content. The user interface 605 includes a control pane 615, a chat pane 625 and a scrollbar 635. The user interface 605 may be implemented by the native application 114 and/or the browser application 112.

In some implementations, the control pane 615 includes an Assistant tab/button 615$a$, a Generate tab/button 615$b$, a Share tab/button 615$c$, and a search field 615$d$. The AI-Assistant tab 615$a$ can be selected to provide content generation/retrieval functions as later discussed. In some implementations, the chat pane 625 provides several topic tiles: Laugh, Compare, Write, Code, Shop, Chat, Travel. The chat pane 625 also includes a new prompt enter box 625$a$ enabling the user to enter a natural language prompt "help me to rank Alaska cruise vacation packages in 2024 covering Vancouver to Juneau based on daily cost from low to high, and evaluate top-3 packages pros and cons considering weather, convenience, and other traveling factors".

User prompts usually describe content that the user would like to have automatically generated by the generative model 126 of the application services platform 110. The application submits the natural language prompt to the application services platform 110 and user information identifying the user of the application to the application services platform 110. The application services platform 110 processes the request according to the techniques provided herein to generate content according to the user prompt.

In this example, in response to the user prompt "help me to write a blog post about how to shop for an Alaska cruise vacation," the request processing unit 122 pass the user prompt to the embedding pre-processing unit 128 to convert the user prompt into a query embedding the proceed as discussed in the above-mentioned implementations. The adapted dense retrieval works behind the scenes, yet the users can notice better responses to the query generated via the adapted dense retrieval, as shown in the tables in FIG. 4.

The request processing unit 122 is configured to receive requests from the native application 114 and/or the browser application 112 of the client device 105. The requests may include but are not limited to requests to create, view, and/or modify various types of content supported by the adapted dense retrieval according to the techniques provided herein. The request processing unit 122 also coordinates communication and exchange of data among components of the application services platform 110 as discussed in the examples which follow.

In one embodiment, the generative model 126 is a language model trained to generate content (e.g., textual, spreadsheet, chart, report, audio, image, video, and the like) in response to natural language prompts input by a user via the native application 114 or via the web. For instance, the generative model 126 is implemented using a large language model (LLM) in some implementations. Examples of such models include but are not limited to a Generative Pre-trained Transformer 3 (GPT-3), or GPT-4 model. Other implementations may utilize other models or other generative models to generate a schedule according to the presentation style/format preference of a user.

For example, the request processing unit 122 receives a user query to generate an blog post from the native application 114 or the browser application 112. For instance, the user request is a natural language prompt input by the user which is then passed on to the prompt construction unit 124. The natural language prompt requests to generate a blog post and identify the user submitting the natural language prompt. The natural language prompt may imply or indicate that the user would like to have the blog post generated by a generative model (e.g., the generative model 126). For example, the user request is expressed in a user prompt: "help me to write a blog post about how to shop for an Alaska cruise vacation."

Once the generative model 126 tokenizes and interprets the user query for writing the particular blog post, the embedding pre-processing unit 128 can apply an adapter to retrieve corpus element embeddings (e.g., facts of Alaska cruise vacations) from the corpus C, i.e., an embedding model (e.g., of cruise vacations) based on the query embedding.

The prompt construction unit 124 can use the facts associated with the Alaska cruise vacations to generate the blog post. The corpus can be online/offline databases, documents, articles, books, presentation content, and/or other types of content containing cruise vacation information.

The prompt construction unit 124 may reformat or otherwise standardize the information to be included in the prompt to a standardized format that is recognized by the generative model 126. The generative model 126 is trained using training data in this standardized format, in some implementations, and utilizing this format for the prompts provided to the generative model 126 may improve the predictions provided by the generative model 126.

In some implementations, when the corpus element embeddings are already in the format directly processable by the generative model 126, the prompt construction unit 124 does not need to convert the corpus element embeddings. In other implementations, when the corpus element embeddings are not in the format directly processable by the generative model 126, the prompt construction unit 124 converts the corpus element embeddings to the format directly processable by the generative model 126. Some common standardized formats recognized by a language model include plain text, Markdown, HTML, JSON, XML, and the like. In one embodiment, the prompt construction unit 124 converts corpus element embeddings into JSON, which is a lightweight and efficient data-interchange format. In addition, ChatML document format is used to provide document context information to ChatGPT, and ChatML may be used which is a JSON-based format that allows a user to specify the conversational history, dialog state, and other contextual information.

The prompt construction unit 124 then constructs a meta prompt based on the query and/or the top-k corpus element embeddings, and then outputs the meta prompt to the generative model 126 to generate the blog post for the user.

In one embodiment, in response to the user prompt, either the prompt construction unit 124 or the generative model 126 can retrieve user data 146 based on an indication identifying the user in the user prompt. The indication may be a user identifier (e.g., a username, email address, and the like), and/or other identifier associated with the user that the application services platform 110 can use to identify the user. The user data can include a user role (e.g., a product manager), a user organization, a user division in the organization, a user preferred presentation style (e.g., non-technical descriptive), and the like. The generative model output may consider the user data.

All the above-discussed requests, prompts, and responses data 140, embeddings data (e.g., corpus) 142, training data 144, and the user data 146 can be stored in an enterprise data storage 136. The enterprise data storage 136 can be physical and/or virtual, depending on the entity's needs and IT infrastructure. Examples of physical enterprise data storage systems include network-attached storage (NAS), storage area network (SAN), direct-attached storage (DAS), tape libraries, hybrid storage arrays, object storage, and the like. Examples of virtual enterprise data storage systems include virtual SAN (vSAN), software-defined storage (SDS), cloud storage, hyper-converged Infrastructure (HCI), network virtualization and software-defined networking (SDN), container storage, and the like.

There are security and privacy considerations and strategies for using open source generative models with enterprise data, such as data anonymization, isolating data, providing secure access, securing the model, using a secure environment, encryption, regular auditing, compliance with laws and regulations, data retention policies, performing privacy impact assessment, user education, performing regular updates, providing disaster recovery and backup, providing an incident response plan, third-party reviews, and the like. By following these security and privacy best practices, the example computing environment 100 can minimize the risks associated with using open source generative models while protecting enterprise data from unauthorized access or exposure.

In an example, the application services platform 110 can store enterprise data separately from generative model training data, to reduce the risk of unintentionally leaking sensitive information during model generation. The application services platform 110 can limit access to generative models and the enterprise data. The application services platform 110 can also implement proper access controls, strong authentication, and authorization mechanisms to ensure that only authorized personnel can interact with the selected model and the enterprise data.

The application services platform 110 can also run the generative model 126 in a secure computing environment. Moreover, the application services platform 110 can employ robust network security, firewalls, and intrusion detection systems to protect against external threats. The application services platform 110 can encrypt the enterprise data and any data in transit. The application services platform 110 can also employ encryption standards for data storage and data transmission to safeguard against data breaches.

Moreover, the application services platform 110 can implement strong security measures around the generative model 126 itself, such as regular security audits, code reviews, and ensuring that the model is up-to-date with security patches. The application services platform 110 can periodically audit the generative model's usage and access logs, to detect any unauthorized or anomalous activities. The application services platform 110 can also ensure that any use of open source generative models complies with relevant data protection regulations such as GDPR, HIPAA, or other industry-specific compliance standards.

The application services platform 110 can establish data retention and data deletion policies to ensure that generated data is not stored longer than necessary, to minimizes the risk of data exposure. The application services platform 110 can perform a privacy impact assessment (PIA) to identify and mitigate potential privacy risks associated with the generative model's usage. The application services platform 110 can also provide mechanisms for training and educating users on the proper handling of enterprise data and the responsible use of generative models. In addition, the application services platform 110 can stay up-to-date with evolving security threats and best practices that are essential for ongoing data protection.

As mentioned, the application services platform 110 complies with privacy guidelines and regulations that apply to the usage of the user data 146 included in the user data 146 to ensure that users have control over how the application services platform 110 utilizes their data. The user is provided with an opportunity to opt into the application services platform 110 to allow the application services platform 110 to access the user data 146 and enable the generative model 126 to generate content according to user preferred style(s)/format(s). In some implementations, the first time that an application, such as the native application 114 or the browser application 112 presents the data analysis assistant to the user, the user is presented with a message that indicates that the user may opt into allowing the application services platform 110 to access user data included in the user data 146 to support the data analysis assistant functionality. The user may opt into allowing the application services platform 110 to access all or a subset of user data included in the user data 146. Furthermore, the user may modify their opt-in status at any time by accessing their user data and selectively opting into or opting out of allowing the application services platform 110 from accessing and utilizing user data from the user data 146 as a whole or individually.

The detailed examples of systems, devices, and techniques described in connection with FIGS. 1-6 are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-5 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 7:
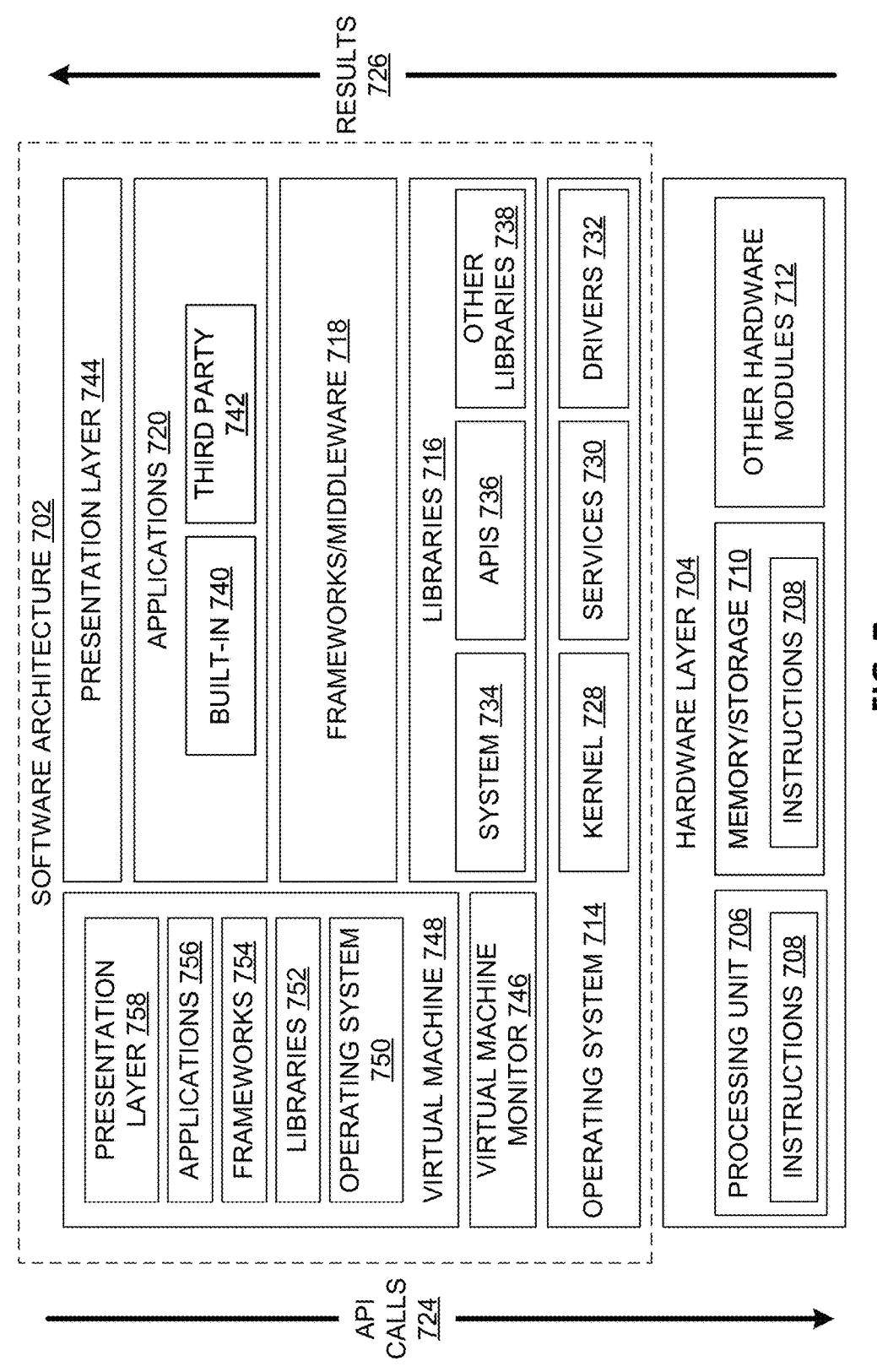
FIG. 7 is a block diagram showing an example software architecture, various portions of which may be used in conjunction with various hardware architectures herein described, which may implement any of the described features.

FIG. 7 is a block diagram 700 illustrating an example software architecture 702, various portions of which may be used in conjunction with various hardware architectures herein described, which may implement any of the above-described features. FIG. 7 is a non-limiting example of a software architecture, and it will be appreciated that many other architectures may be implemented to facilitate the functionality described herein. The software architecture 702 may execute on hardware such as a machine 800 of FIG. 8 that includes, among other things, processors 810, memory 830, and input/output (I/O) components 850. A representative hardware layer 704 is illustrated and can represent, for example, the machine 800 of FIG. 8. The representative hardware layer 704 includes a processing unit 706 and associated executable instructions 708. The executable instructions 708 represent executable instructions of the software architecture 702, including implementation of the methods, modules and so forth described herein. The hardware layer 704 also includes a memory/storage 710, which also includes the executable instructions 708 and accompanying data. The hardware layer 704 may also include other hardware modules 712. Instructions 708 held by processing unit 706 may be portions of instructions 708 held by the memory/storage 710.

The example software architecture 702 may be conceptualized as layers, each providing various functionality. For example, the software architecture 702 may include layers and components such as an operating system (OS) 714, libraries 716, frameworks 718, applications 720, and a presentation layer 744. Operationally, the applications 720 and/or other components within the layers may invoke API calls 724 to other layers and receive corresponding results 726. The layers illustrated are representative in nature and other software architectures may include additional or different layers. For example, some mobile or special purpose operating systems may not provide the frameworks/middleware 718.

The OS 714 may manage hardware resources and provide common services. The OS 714 may include, for example, a kernel 728, services 730, and drivers 732. The kernel 728 may act as an abstraction layer between the hardware layer 704 and other software layers. For example, the kernel 728 may be responsible for memory management, processor management (for example, scheduling), component management, networking, security settings, and so on. The services 730 may provide other common services for the other software layers. The drivers 732 may be responsible for controlling or interfacing with the underlying hardware layer 704. For instance, the drivers 732 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 716 may provide a common infrastructure that may be used by the applications 720 and/or other components and/or layers. The libraries 716 typically provide functionality for use by other software modules to perform tasks, rather than interacting directly with the OS 714. The libraries 716 may include system libraries 734 (for example, C standard library) that may provide functions such as memory allocation, string manipulation, file operations. In addition, the libraries 716 may include API libraries 736 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 716 may also include a wide variety of other libraries 738 to provide many functions for applications 720 and other software modules.

The frameworks 718 (also sometimes referred to as middleware) provide a higher-level common infrastructure that may be used by the applications 720 and/or other software modules. For example, the frameworks 718 may provide various graphic user interface (GUI) functions, high-level resource management, or high-level location services. The frameworks 718 may provide a broad spectrum of other APIs for applications 720 and/or other software modules.

The applications 720 include built-in applications 740 and/or third-party applications 742. Examples of built-in applications 740 may include, but are not limited to, a contacts application, a browser application, a location application, a media application, a messaging application, and/or a game application. Third-party applications 742 may include any applications developed by an entity other than the vendor of the particular platform. The applications 720 may use functions available via OS 714, libraries 716, frameworks 718, and presentation layer 744 to create user interfaces to interact with users.

Some software architectures use virtual machines, as illustrated by a virtual machine 748. The virtual machine 748 provides an execution environment where applications/modules can execute as if they were executing on a hardware machine (such as the machine 800 of FIG. 8, for example). The virtual machine 748 may be hosted by a host OS (for example, OS 714) or hypervisor, and may have a virtual machine monitor 746 which manages operation of the virtual machine 748 and interoperation with the host operating system. A software architecture, which may be different from software architecture 702 outside of the virtual machine, executes within the virtual machine 748 such as an OS 750, libraries 752, frameworks 754, applications 756, and/or a presentation layer 758.

FIG. 8 is a block diagram illustrating components of an example machine 800 configured to read instructions from a machine-readable medium (for example, a machine-readable storage medium) and perform any of the features described herein. The example machine 800 is in a form of a computer system, within which instructions 816 (for example, in the form of software components) for causing the machine 800 to perform any of the features described herein may be executed. As such, the instructions 816 may be used to implement modules or components described herein. The instructions 816 cause unprogrammed and/or unconfigured machine 800 to operate as a particular machine configured to carry out the described features. The machine 800 may be configured to operate as a standalone device or may be coupled (for example, networked) to other machines. In a networked deployment, the machine 800 may operate in the capacity of a server machine or a client machine in a server-client network environment, or as a node in a peerto-peer or distributed network environment. Machine 800 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IOT) device. Further, although only a single machine 800 is illustrated, the term "machine" includes a collection of machines that individually or jointly execute the instructions 816.

The machine 800 may include processors 810, memory 830, and I/O components 850, which may be communicatively coupled via, for example, a bus 802. The bus 802 may include multiple buses coupling various elements of machine 800 via various bus technologies and protocols. In an example, the processors 810 (including, for example, a central processing unit (CPU), a graphics processing unit (GPU), a digital signal processor (DSP), an ASIC, or a suitable combination thereof) may include one or more processors 812a to 812n that may execute the instructions 816 and process data. In some examples, one or more processors 810 may execute instructions provided or identified by one or more other processors 810. The term "processor" includes a multi-core processor including cores that may execute instructions contemporaneously. Although FIG. 8 shows multiple processors, the machine 800 may include a single processor with a single core, a single processor with multiple cores (for example, a multi-core processor), multiple processors each with a single core, multiple processors each with multiple cores, or any combination thereof. In some examples, the machine 800 may include multiple processors distributed among multiple machines.

The memory/storage 830 may include a main memory 832, a static memory 834, or other memory, and a storage unit 836, both accessible to the processors 810 such as via the bus 802. The storage unit 836 and memory 832, 834 store instructions 816 embodying any one or more of the functions described herein. The memory/storage 830 may also store temporary, intermediate, and/or long-term data for processors 810. The instructions 816 may also reside, completely or partially, within the memory 832, 834, within the storage unit 836, within at least one of the processors 810 (for example, within a command buffer or cache memory), within memory at least one of I/O components 850, or any suitable combination thereof, during execution thereof. Accordingly, the memory 832, 834, the storage unit 836, memory in processors 810, and memory in I/O components 850 are examples of machine-readable media.

As used herein, "machine-readable medium" refers to a device able to temporarily or permanently store instructions and data that cause machine 800 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 816) for execution by a machine 800 such that the instructions, when executed by one or more processors 810 of the machine 800, cause the machine 800 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 850 may include a wide variety of hardware components adapted to receive input, provide output, produce output, transmit information, exchange information, capture measurements, and so on. The specific I/O components 850 included in a particular machine will depend on the type and/or function of the machine. For example, mobile devices such as mobile phones may include a touch input device, whereas a headless server or IoT device may not include such a touch input device. The particular examples of I/O components illustrated in FIG. 8 are in no way limiting, and other types of components may be included in machine 800. The grouping of I/O components 850 are merely for simplifying this discussion, and the grouping is in no way limiting. In various examples, the I/O components 850 may include user output components 852 and user input components 854. User output components 852 may include, for example, display components for displaying information (for example, a liquid crystal display (LCD) or a projector), acoustic components (for example, speakers), haptic components (for example, a vibratory motor or force-feedback device), and/or other signal generators. User input components 854 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 850 may include biometric components 856, motion components 858, environmental components 860, and/or position components 862, among a wide array of other physical sensor components. The biometric components 856 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 858 may include, for example, acceleration sensors (for example, an accelerometer) and rotation sensors (for example, a gyroscope). The environmental components 860 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 862 may include, for example, location sensors (for example, a Global Position System (GPS) receiver), altitude sensors (for example, an air pressure sensor from which altitude may be derived), and/or orientation sensors (for example, magnetometers).

The I/O components 850 may include communication components 864, implementing a wide variety of technologies operable to couple the machine 800 to network(s) 870 and/or device(s) 880 via respective communicative couplings 872 and 882. The communication components 864 may include one or more network interface components or other suitable devices to interface with the network(s) 870. The communication components 864 may include, for example, components adapted to provide wired communication, wireless communication, cellular communication, Near Field Communication (NFC), Bluetooth communication, Wi-Fi, and/or communication via other modalities. The device(s) 880 may include other machines or various peripheral devices (for example, coupled via USB).

In some examples, the communication components 864 may detect identifiers or include components adapted to detect identifiers. For example, the communication components 864 may include Radio Frequency Identification (RFID) tag readers, NFC detectors, optical sensors (for example, one-or multi-dimensional bar codes, or other optical codes), and/or acoustic detectors (for example, microphones to identify tagged audio signals). In some examples, location information may be determined based on information from the communication components 864, such as, but not limited to, geo-location via Internet Protocol (IP) address, location via Wi-Fi, cellular, NFC, Bluetooth, or other wireless station identification and/or signal triangulation.

In the preceding detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element. Furthermore, subsequent limitations referring back to "said element" or "the element" performing certain functions signifies that "said element" or "the element" alone or in combination with additional identical elements in the process, method, article, or apparatus are capable of performing all of the recited functions.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
  a processor, and
  a machine-readable storage medium storing executable instructions which, when executed by the processor, cause the processor alone or in combination with other processors to perform operations:
    receiving, via a user interface of a client device, a query to a large language model (LLM), wherein the LLM works in conjunction with an embedding model comprising a corpus of artifacts;
    converting the query into a query embedding;
    transforming the query embedding into a transformed query embedding using a first transformation function, wherein the first transformation function adds a first residual term to the query embedding, wherein the first residual term is specific for a task associated with the query;

measuring a first similarity between the transformed query embedding and a plurality of corpus element embeddings in an embedding space of the embedding model;

determining one or more first top-rated corpus elements associated with the plurality of corpus element embeddings based on the first similarity;

incorporating the one or more first top-rated corpus elements into the query as a prompt to the LLM to generate a response to the query; and providing, via the user interface, the response.

2. The data processing system of claim 1, wherein the machine-readable storage medium further includes instructions configured to cause the processor alone or in combination with other processors to perform operations of:

modeling a parameter of the first residual term as a pair of matrices including a first matrix of keys and a first matrix of values.

3. The data processing system of claim 2, wherein the machine-readable storage medium further includes instructions configured to cause the processor alone or in combination with other processors to perform operations of:

for the task, selecting a training dataset, wherein the training dataset comprises examples for retrieving artifacts in the corpus for the task; and determining respective one or more of the matrix of keys and respective one or more of the matrix of values for the task based on minimizing a loss function over all pairs of positive and negative corpus elements for each query in the training dataset, where the loss function is based on transformed query embeddings.

4. The data processing system of claim 3, wherein the machine-readable storage medium further includes instructions configured to cause the processor alone or in combination with other processors to perform operations of:

modifying the loss function into a modified loss function by replacing the negative corpus elements in the loss function with a negative corpus element that is closest to the query; and determining respective one or more of the matrix of keys and respective one or more of the matrix of values for the task based on minimizing the modified loss function over all pairs of positive and negative corpus elements for each query in the training dataset.

5. The data processing system of claim 3, wherein the machine-readable storage medium further includes instructions configured to cause the processor alone or in combination with other processors to perform operations of:

transforming a set of corpus element embeddings into a set of transformed corpus element embeddings using a second transformation function, wherein the second transformation function adds a second residual term to the set of corpus element embeddings, and wherein the second residual term is specific for the task;

calculating a second similarity between the transformed query embedding and the set of transformed corpus element embeddings;

obtaining for the query one or more second top-rated corpus elements associated with the set of transformed corpus element embeddings based on the second similarity;

providing to the LLM the one or more second top-rated corpus elements to generate another response to the query; and providing, via the user interface, the other response.

6. The data processing system of claim 5, wherein the machine-readable storage medium further includes instructions configured to cause the processor alone or in combination with other processors to perform operations of:

modeling a parameter of the second residual term as a pair of matrices including a second matrix of keys and a second matrix of values.

7. The data processing system of claim 6, wherein the machine-readable storage medium further includes instructions configured to cause the processor alone or in combination with other processors to perform operations of:

determining respective one or more of the matrix of keys and respective one or more of the matrix of values for the task based on minimizing the loss function over all pairs of positive and negative corpus elements for each query in the training dataset, wherein the loss function is based on transformed query embeddings, transformed positive corpus element embeddings, and transformed negative corpus element embeddings.

8. The data processing system of claim 7, wherein the machine-readable storage medium further includes instructions configured to cause the processor alone or in combination with other processors to perform operations of:

modifying the loss function into a modified loss function by replacing the negative corpus elements in the loss function with a negative corpus element that is closest to the query; and determining respective one or more of the matrix of keys and respective one or more of the matrix of values for the task based on minimizing the modified loss function over all pairs of positive and negative corpus elements for each query in the training dataset.

9. The data processing system of claim 1, wherein the one or more first top-rated corpus elements are nearest neighbors of the transformed query embedding in the embedding space of the embedding model.

10. The data processing system of claim 5, wherein the one or more second top-rated corpus elements are nearest neighbors of the transformed query embedding in the embedding space of the embedding model.

11. The data processing system of claim 1, wherein the artifacts are converted using a second embedding calculator that is different from a first embedding calculator that converts the query.

12. The data processing system of claim 1, wherein the artifacts are converted using an embedding calculator that converts the query.

13. The data processing system of claim 1, wherein an artifact of the query is different from artifacts of the corpus and wherein the artifacts of the corpus comprise at least one of code, documentation, structured text, semi-structured text, data, or artifacts in domain-specific languages.

14. The data processing system of claim 1, wherein the first similarity is a cosine similarity.

15. A method comprising:

receiving, via a user interface of a client device, a query to a large language model (LLM), wherein the LLM works in conjunction with an embedding model comprising a corpus of artifacts;

converting the query into a query embedding;

transforming the query embedding into a transformed query embedding using a first transformation function, wherein the first transformation function adds a first residual term to the query embedding, wherein the first residual term is specific for a task associated with the query;

measuring a first similarity between the transformed query embedding and a plurality of corpus element embeddings in an embedding space of the embedding model;

determining one or more first top-rated corpus elements associated with the plurality of corpus element embeddings based on the first similarity;

incorporating the one or more first top-rated corpus elements into the query as a prompt to the LLM to generate a response to the query; and providing, via the user interface, the response.

16. The method of claim 15, further comprising:

modeling a parameter of the first residual term as a pair of matrices including a first matrix of keys and a first matrix of values.

17. The method of claim 16, further comprising:

for the task, selecting a training dataset comprises examples for retrieving artifacts in the corpus for the task; and determining respective one or more of the matrix of keys and respective one or more of the matrix of values for the task based on minimizing a loss function over all pairs of positive and negative corpus elements for each query in the training dataset, where the loss function is based on transformed query embeddings.

18. A non-transitory computer readable medium on which are stored instructions that, when executed, cause a programmable device to perform functions of:

receiving, via a user interface of a client device, a query to a large language model (LLM), wherein the LLM works in conjunction with an embedding model comprising a corpus of artifacts;

converting the query into a query embedding;

transforming the query embedding into a transformed query embedding using a first transformation function, wherein the first transformation function adds a first residual term to the query embedding, wherein the first residual term is specific for a task associated with the query;

measuring a first similarity between the transformed query embedding and a plurality of corpus element embeddings in an embedding space of the embedding model;

determining one or more first top-rated corpus elements associated with the plurality of corpus element embeddings based on the first similarity;

incorporating the one or more first top-rated corpus elements into the query as a prompt to the LLM to generate a response to the query; and providing, via the user interface, the response.

19. The non-transitory computer readable medium of claim 18, wherein the instructions when executed, further cause the programmable device to perform functions of:

modeling a parameter of the first residual term as a pair of matrices including a first matrix of keys and a first matrix of values.

20. The non-transitory computer readable medium of claim 19, wherein the instructions when executed, further cause the programmable device to perform functions of:

for the task, selecting a training dataset, wherein the training dataset comprises examples for retrieving artifacts in the corpus for the task; and determining respective one or more of the matrix of keys and respective one or more of the matrix of values for the task based on minimizing a loss function over all pairs of positive and negative corpus elements for each query in the training dataset, where the loss function is based on transformed query embeddings.

* * * * *